US011656805B2

(12) United States Patent
Shanbhogue et al.

(10) Patent No.: US 11,656,805 B2
(45) Date of Patent: May 23, 2023

(54) PROCESSORS, METHODS, SYSTEMS, AND INSTRUCTIONS TO PROTECT SHADOW STACKS

(71) Applicant: Intel Corporation, Santa Clara, CA (US)

(72) Inventors: Vedvyas Shanbhogue, Austin, TX (US); Jason W. Brandt, Austin, TX (US); Ravi L. Sahita, Beaverton, OR (US); Barry E. Huntley, Hillsboro, OR (US); Baiju V. Patel, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/131,731

(22) Filed: Dec. 22, 2020

(65) Prior Publication Data

US 2021/0109684 A1    Apr. 15, 2021

Related U.S. Application Data

(63) Continuation of application No. 14/752,221, filed on Jun. 26, 2015.

(51) Int. Cl.
*H04L 29/06* (2006.01)
*G06F 3/06* (2006.01)
(Continued)

(52) U.S. Cl.
CPC .......... *G06F 3/0673* (2013.01); *G06F 3/0622* (2013.01); *G06F 3/0629* (2013.01);
(Continued)

(58) Field of Classification Search
CPC ............... G06F 9/30134; G06F 9/3806; G06F 12/1491; G06F 21/1491
See application file for complete search history.

(56) References Cited

U.S. PATENT DOCUMENTS 3,794,980 A    2/1974  Cogar et al.
5,287,309 A    2/1994  Kai
(Continued)

FOREIGN PATENT DOCUMENTS

CN    1469254 A    1/2004
CN    106687972 A    5/2017
(Continued)

OTHER PUBLICATIONS

Corliss et al., Using DISE to Protect Addresses from Attack, 2005, ACM SIGARCH Computer Architecture News, pp. 65-72 (Year: 2005).

(Continued)

*Primary Examiner* — Ellen Tran
(74) *Attorney, Agent, or Firm* — NDWE, LLP

(57) ABSTRACT

A processor of an aspect includes a decode unit to decode an instruction. The processor also includes an execution unit coupled with the decode unit. The execution unit, in response to the instruction, is to determine that an attempted change due to the instruction, to a shadow stack pointer of a shadow stack, would cause the shadow stack pointer to exceed an allowed range. The execution unit is also to take an exception in response to determining that the attempted change to the shadow stack pointer would cause the shadow stack pointer to exceed the allowed range. Other processors, methods, systems, and instructions are disclosed.

21 Claims, 19 Drawing Sheets

(51) Int. Cl.
| | |
|---|---|
| *G06F 9/30* | (2018.01) |
| *G06F 21/52* | (2013.01) |
| *G06F 9/38* | (2018.01) |
| *G06F 12/1009* | (2016.01) |
| *G06F 12/109* | (2016.01) |
| *G06F 12/1027* | (2016.01) |
| *G06F 12/1081* | (2016.01) |
| *G06F 12/1045* | (2016.01) |
| *G06F 12/14* | (2006.01) |
| *G06F 12/1036* | (2016.01) |

(52) U.S. Cl.
CPC ...... *G06F 9/30054* (2013.01); *G06F 9/30101* (2013.01); *G06F 9/30134* (2013.01); *G06F 9/30145* (2013.01); *G06F 9/3806* (2013.01); *G06F 9/3861* (2013.01); *G06F 12/1009* (2013.01); *G06F 12/109* (2013.01); *G06F 12/1027* (2013.01); *G06F 12/1036* (2013.01); *G06F 12/1063* (2013.01); *G06F 12/1081* (2013.01); *G06F 12/1491* (2013.01); *G06F 21/52* (2013.01); *G06F 2212/1052* (2013.01); *G06F 2212/151* (2013.01); *G06F 2212/651* (2013.01); *G06F 2212/657* (2013.01)

(56) References Cited

U.S. PATENT DOCUMENTS

| | | | |
|---|---|---|---|
| 5,497,494 A * | 3/1996 | Combs | G06F 9/4418 713/323 |
| 5,499,349 A | 3/1996 | Nikhil et al. | |
| 5,634,046 A | 5/1997 | Chatterjee et al. | |
| 5,640,582 A | 6/1997 | Hays et al. | |
| 5,862,400 A | 1/1999 | Reed et al. | |
| 5,968,169 A | 10/1999 | Pickett | |
| 6,128,728 A | 10/2000 | Dowling | |
| 6,202,176 B1 * | 3/2001 | Baldischweiler | G06F 12/1425 714/39 |
| 6,751,749 B2 | 6/2004 | Hofstee et al. | |
| 7,086,088 B2 | 8/2006 | Narayanan | |
| 7,581,089 B1 | 8/2009 | White | |
| 7,594,111 B2 | 9/2009 | Kiriansky et al. | |
| 8,117,660 B2 * | 2/2012 | Pan | G06F 21/54 726/25 |
| 8,209,757 B1 | 6/2012 | Kennedy et al. | |
| 9,477,453 B1 | 10/2016 | Ince et al. | |
| 9,501,637 B2 | 11/2016 | Lemay et al. | |
| 9,703,948 B2 * | 7/2017 | Caprioli | G06F 9/30145 |
| 9,767,272 B2 | 9/2017 | Shanbhogue et al. | |
| 10,394,556 B2 | 8/2019 | Shanbhogue et al. | |
| 10,430,580 B2 | 10/2019 | Shanbhogue et al. | |
| 10,445,494 B2 | 10/2019 | Shanbhogue et al. | |
| 11,176,243 B2 | 11/2021 | Shanbhogue et al. | |
| 2002/0019902 A1 | 2/2002 | Christie | |
| 2003/0196076 A1 | 10/2003 | Zabarski et al. | |
| 2004/0103252 A1 * | 5/2004 | Lee | G06F 21/52 711/132 |
| 2004/0168078 A1 | 8/2004 | Brodley et al. | |
| 2004/0221141 A1 | 11/2004 | Padmanabhan et al. | |
| 2005/0044292 A1 * | 2/2005 | McKeen | G06F 21/52 710/51 |
| 2005/0097262 A1 | 5/2005 | Falsett et al. | |
| 2007/0136728 A1 | 6/2007 | Saito | |
| 2009/0320129 A1 | 12/2009 | Pan et al. | |
| 2010/0115243 A1 | 5/2010 | Kissell | |
| 2010/0174893 A1 * | 7/2010 | Rivera | G06F 9/38 712/E9.06 |
| 2010/0293342 A1 | 11/2010 | Morfey et al. | |
| 2012/0030392 A1 | 2/2012 | Norden et al. | |
| 2012/0036299 A1 | 2/2012 | Renno | |
| 2012/0036341 A1 | 2/2012 | Morfey et al. | |
| 2013/0205125 A1 | 8/2013 | Grocutt | |
| 2014/0283088 A1 | 9/2014 | Alharbi et al. | |
| 2014/0365742 A1 | 12/2014 | Patel et al. | |
| 2014/0380468 A1 | 12/2014 | Gerzon et al. | |
| 2015/0150024 A1 | 5/2015 | Grossi et al. | |
| 2015/0278516 A1 | 10/2015 | Caprioli | |
| 2016/0179538 A1 | 6/2016 | Collins et al. | |
| 2016/0300056 A1 | 10/2016 | Tashiro et al. | |
| 2016/0378466 A1 | 12/2016 | Xekalakis et al. | |
| 2016/0381050 A1 | 12/2016 | Shanbhogue et al. | |
| 2017/0017791 A1 | 1/2017 | Brandt et al. | |
| 2017/0090927 A1 | 3/2017 | Caprioli et al. | |
| 2017/0185458 A1 | 6/2017 | Chaffin et al. | |
| 2017/0228535 A1 | 8/2017 | Shanbhogue et al. | |

FOREIGN PATENT DOCUMENTS

| | | |
|---|---|---|
| KR | 10-2008-0075175 A | 8/2008 |
| TW | 486667 B | 5/2002 |
| TW | 559729 B | 11/2003 |
| TW | 200709041 A | 3/2007 |
| TW | 201241627 A | 10/2012 |
| TW | I470434 B | 1/2015 |
| WO | 2013/019350 A2 | 2/2013 |
| WO | 2014/197310 A1 | 12/2014 |
| WO | 2015/044993 A1 | 4/2015 |

OTHER PUBLICATIONS

Non-Final Office Action, U.S. Appl. No. 14/752,221, dated Jun. 30, 2021, 21 pages.
Notice of Allowance, U.S. Appl. No. 16/585,373, dated Jul. 27, 2021, 8 pages.
Office Action, TW App. No. 109141256, dated Dec. 15, 2021, 3 pages of Original Document Only.
Office Action, TW App. No. 109144236, dated Dec. 2, 2021, 4 pages of Original Document Only.
Office Action, TW App. No. 110101138, dated May 25, 2021, 8 pages (4 pages of English Translation and 4 pages of Original Document).
Allowance Decision of Examination, TW App. No. 106101043, dated Oct. 20, 2020, 3 pages (1 page of English Translation and 2 pages of Original Document).
AMD, "AMD64 Architecture Programmer's Manual vol. 3: General-Purpose and System Instructions", Advanced Micro Devices Inc., AMD64 Technology, Rev. 3.22, Jun. 2015, 27 pages.
Decision to grant a European patent pursuant to Article 97(1) EPC, EP App. No. 16814979.7, dated Nov. 29, 2020, 2 pages.
Extended European Search Report, EP App. No. 16814979.7, dated Mar. 20, 2019, 13 pages.
Final Office action, U.S. Appl. No. 14/752,221, filed Mar. 7, 2018, 28 pages.
Final Office Action, U.S. Appl. No. 14/752,221, filed Oct. 8, 2020, 19 pages.
Final Office Action, U.S. Appl. No. 16/585,373, filed Dec. 16, 2020, 6 pages.
Intention to Grant, EP App. No. 16814979.7, dated Jun. 4, 2020, 6 pages.
International Preliminary Report on Patentability, PCT App. No. PCT/US2016/034364, dated Jan. 4, 2018, 11 pages.
International Preliminary Report on Patentability, PCT App. No. PCT/US2016/063207, dated Jul. 5, 2018, 7 pages.
International Preliminary Report on Patentability, PCT App. No. PCT/US2017/012572, dated Aug. 16, 2018, 11 pages.
International Search Report and Written Opinion received for PCT Application No. PCT/US2016/034364, dated Sep. 13, 2016, 14 pages.
International Search Report and Written Opinion, PCT App. No. PCT/US2016/063207, dated Feb. 27, 2017, 9 pages.
International Search Report and Written Opinion, PCT App. No. PCT/US2017/012572, dated Apr. 4, 2017, 13 pages.
Non-Final Office Action, U.S. Appl. No. 14/752,221, dated Jan. 22, 2020, 18 pages.
Non-final Office Action, U.S. Appl. No. 14/752,221, dated May 8, 2017, 23 pages.

(56) References Cited

OTHER PUBLICATIONS

Non-Final Office Action, U.S. Appl. No. 16/534,970, dated Aug. 13, 2020, 5 pages.
Non-Final Office Action, U.S. Appl. No. 16/585,373, dated Jul. 6, 2020, 8 pages.
Notice of Allowance, TW App. No. 105115781, dated Aug. 24, 2020, 3 pages (1 page of English Translation and 2 pages of Original Document).
Notice of Allowance, TW App. No. 105136946, dated Sep. 14, 2020, 3 pages (1 page of English Translation and 2 pages of Original Document).
Notice of Allowance, U.S. Appl. No. 14/975,840, dated May 7, 2019, 9 pages.
Office Action, TW App. No. 105115781, dated Apr. 9, 2020, 21 pages (10 pages of English Translation and 11 pages of Original Document).
Office Action, TW App. No. 105136946, dated May 29, 2020, 7 pages (4 pages of English Translation and 3 pages of Original Document).
Office Action, TW App. No. 106101043, dated Jun. 29, 2020, 14 pages (7 pages of English Translation and 7 pages of Original Document).
Rajadurai A., "SPARC M7 Chip—32 cores—Mind Blowing performance," Oracle Angelo's Soapbox Blog, Aug. 15, 2014, downloaded from https://blogs.oracle.com/rajadurai/sparc-m7-chip-32-cores-mind-blowing-performance-v2 on Aug. 10, 2017, 7 pages.
Corliss et al., "Using DISE to Protect Return Addresses from Attack", ACM SIGARCH Computer Architecture News, vol. 33, No. 1, Mar. 2005, pp. 65-72.

European Search Report and Search Opinion, EP App. No. 20209381.1, dated Mar. 3, 2021, 13 pages.
Notice of Allowance and Fees Due (PTOL-85) dated Feb. 1, 2021 for U.S. Appl. No. 16/534,970, 7 pages.
Office Action, CN App. No. 201680029980.5, dated Jan. 27, 2021, 15 pages of Original Document Only.
Allowance Decision of Examination and Search Report, TW App. No. 109141256, dated Mar. 23, 2022, 5 pages (2 pages of English Translation and 3 pages of Original Document).
Allowance Decision of Examination, TW App. No. 109144236, dated May 9, 2022, 3 pages 1 page of English Translation and 2 pages of Original Document).
Final Office Action, U.S. Appl. No. 14/752,221, dated Mar. 21, 2022, 26 pages.
Intention to grant, EP App. No. 20209381.1, dated Jul. 13, 2022, 6 pages.
Non-Final Office Action, U.S. Appl. No. 17/340,632, dated Jul. 26, 2022, 6 pages.
Decision to grant a European patent, EP App. No. 20209381.1, dated Dec. 1, 2022, 2 pages.
European Search Report and Search Opinion, EP App. No. 22184595.1, dated Nov. 4, 2022, 12 pages.
Non-Final Office Action, U.S. Appl. No. 17/407,035, dated Dec. 7, 2022, 9 pages.
Office Action, TW App. No. 111123266, dated Dec. 6, 2022, 3 pages of Original Document Only.
Office Action, TW App. No. 111130271, dated Nov. 28, 2022, 3 pages of Original Document Only.
Decision On Rejection, CN App. No. 201680029980.5, dated Nov. 4, 2021, 25 pages (13 pages of English Translation and 12 pages of Original Document).

* cited by examiner

FIG. 6

32-BIT TSS 645

| | | |
|---|---|---|
| SSDT SELECTOR 2 | 652 | 120 |
| SSDT SELECTOR 1 | 651 | 116 |
| SSDT SELECTOR 0 | 650 | 112 |
| TSS SSP | 649 | 108 |
| TSS SSDT SELECTOR | 648 | 104 |
| | | 100 |
| OTHER FIELDS 647 | | |
| | | 72 |
| | | 68 |
| STATE SAVE FIELDS 646 | | |
| | | 28 |
| RESERVED | SS2 | 24 |
| ESP2 | | 20 |
| RESERVED | SS1 | 16 |
| ESP1 | | 12 |
| RESERVED | SS0 | 8 |
| ESP0 | | 4 |
| RESERVED | PREVIOUS TASK LINK | 0 |

FIG. 7

64-BIT TSS 745

| | | | |
|---|---|---|---|
| SSDT SELECTOR IST7 | | 767 | 140 |
| SSDT SELECTOR IST6 | | 766 | 136 |
| SSDT SELECTOR IST5 | | 765 | 132 |
| SSDT SELECTOR IST4 | | 764 | 128 |
| SSDT SELECTOR IST3 | | 763 | 124 |
| SSDT SELECTOR IST2 | | 762 | 120 |
| SSDT SELECTOR IST1 | | 761 | 116 |
| SSDT SELECTOR 2 | | 760 | 112 |
| SSDT SELECTOR 1 | | 759 | 108 |
| SSDT SELECTOR 0 | | 758 | 104 |
| I/O MAP BASE ADDRESS | RESERVED | | 100 |
| RESERVED | | | 96 |
| RESERVED | | | 92 |
| IST7 (upper 32 bits) | | | 88 |
| IST7 (lower 32 bits) | | | 84 |
| IST6 (upper 32 bits) | | | 80 |
| IST6 (lower 32 bits) | | | 76 |
| IST5 (upper 32 bits) | | | 72 |
| IST5 (lower 32 bits) | | | 68 |
| IST4 (upper 32 bits) | | | 64 |
| IST4 (lower 32 bits) | | | 60 |
| IST3 (upper 32 bits) | | | 56 |
| IST3 (lower 32 bits) | | | 52 |
| IST2 (upper 32 bits) | | | 48 |
| IST2 (lower 32 bits) | | | 44 |
| IST1 (upper 32 bits) | | | 40 |
| IST1 (lower 32 bits) | | | 38 |
| RESERVED | | | 32 |
| RESERVED | | | 28 |
| RSP2 (upper 32 bits) | | | 24 |
| RSP2 (lower 32 bits) | | | 20 |
| RSP1 (upper 32 bits) | | | 16 |
| RSP1 (lower 32 bits) | | | 12 |
| RSP0 (upper 32 bits) | | | 8 |
| RSP0 (lower 32 bits) | | | 4 |
| RESERVED | | | 0 |

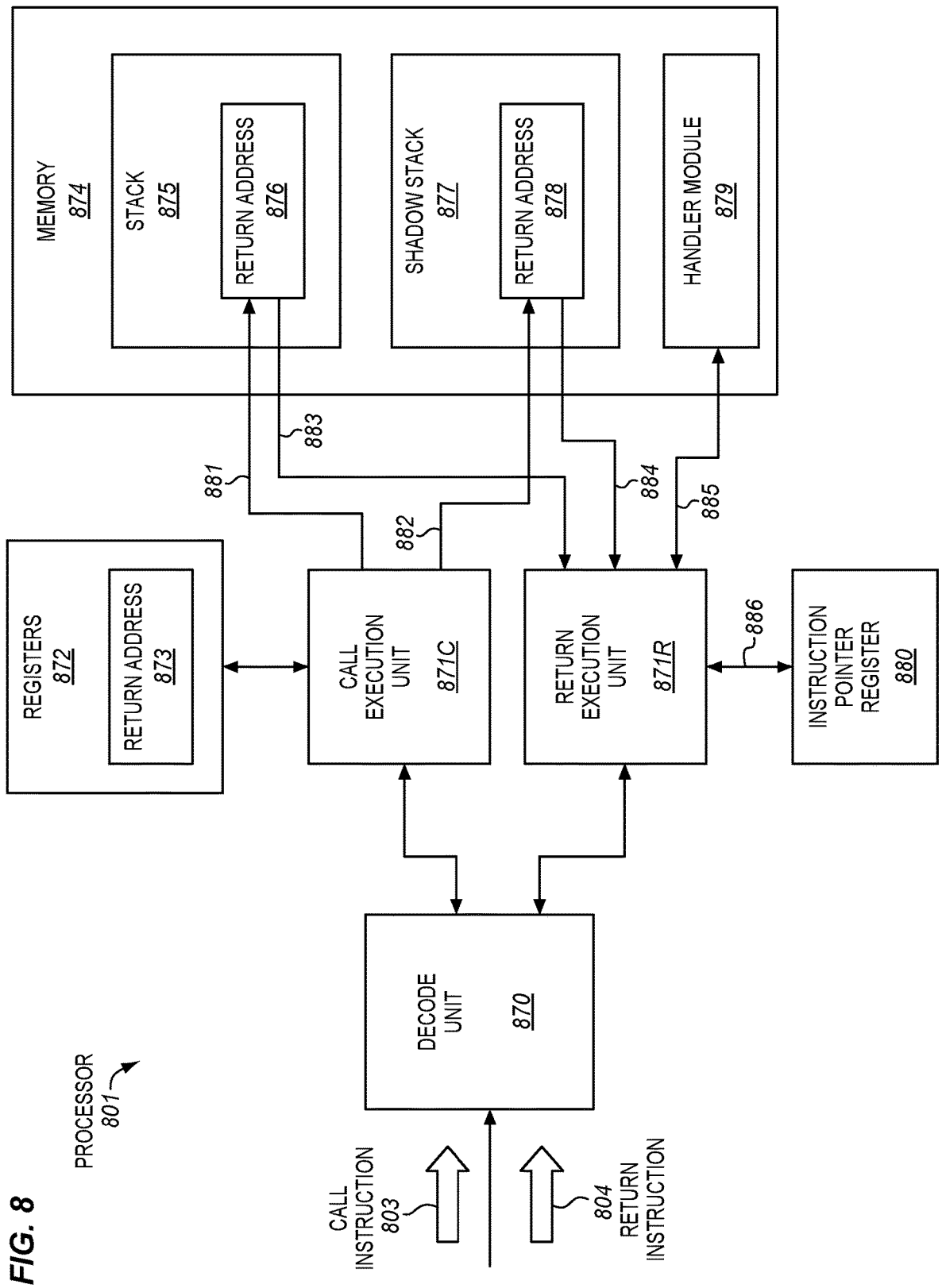

PROCESSORS, METHODS, SYSTEMS, AND INSTRUCTIONS TO PROTECT SHADOW STACKS

CROSS-REFERENCE TO RELATED APPLICATION

This patent application is a continuation of U.S. patent application Ser. No. 14/752,221, filed on Jun. 26, 2015 entitled as PROCESSORS, METHODS, SYSTEMS, AND INSTRUCTIONS TO PROTECT SHADOW STACKS, which is hereby incorporated herein by this reference in its entirety and for all purposes.

BACKGROUND

Technical Field

Embodiments described herein generally relate to processors. In particular, embodiments described herein generally relate to processors with enhanced security.

BACKGROUND INFORMATION

Return-oriented programming (ROP) and jump-oriented programming (JOP) are computer security exploit techniques that attackers can use to gain control over computer systems or other electronic devices and perform malicious actions. In these techniques, the attackers gain control of the call stack in order to hijack program control flow.

Control of the call stack is often achieved through a buffer overrun exploit or attack. In a buffer overrun, a function that does not sufficiently perform bounds checking before storing data into memory may accept more data than can be properly stored. For example, an attacker may send more data to a web browser than the web browser can properly store. If the data is being stored on the stack, some data may exceed the storage space allocated to that function's variables and overwrite a return address. The return address may represent an address that is stored on the stack by a call procedure instruction, which is intended to be used to redirect control flow back to a calling function after the called procedure has finished. However, in a buffer overrun attack or exploit, the return address may be overwritten with a different return address. This may allow the attacker to divert control flow to the different return address, execute code starting at the different return address, and perform potentially undesirable and/or malicious actions.

For example, in an ROP attack, the attacker may chain together sequences of what are known as "gadgets." Each gadget may represent a set of one or a few instructions followed by a return from procedure instruction. The attacker may analyze code such as applications, system-level code, drivers, libraries, and the like, to locate or identify desired gadgets. For example, the attacker may scan for the opcode of the return from procedure instruction. The preceding instructions before such identified return from procedure instructions can potentially represent different types of gadgets with different functionalities. By way of example, the attacker may identify a pop stack instruction followed by a return instruction as a first gadget, a register-to-register move instruction followed by a return instruction as a second gadget, and so on. In some cases, the attacker may be able to identify enough gadgets to be able to string together and perform a variety of different malicious actions.

Representatively, the buffer overrun attack may initially be used to hijack the return address on the stack and thereby hijack control flow. The address of the first instruction of the first gadget may be stored on the stack to divert the control flow to the first gadget. Instead of returning to a calling procedure associated with the call procedure instruction, the control flow may transfer to the first instruction of the first gadget chosen by the attacker. Then, the return instruction of the first gadget may divert control flow to the second gadget. In this way, the return addresses of a series of gadgets may be sequentially stored on the stack and jumped to by the return instructions of the chained gadgets. By chaining the gadgets together in particular orders, the attacker may be able to create new program functionalities from pre-existing code. The attackers may potentially use this for undesirable or harmful purposes, such as, for example, stealing confidential information, interfering with or attacking other applications, sending emails, sending text messages, posting tweets, or exploiting kernel vulnerabilities.

BRIEF DESCRIPTION OF THE DRAWINGS

The invention may best be understood by referring to the following description and accompanying drawings that are used to illustrate embodiments. In the drawings:

FIG. 6 is a block diagram of an embodiment of an example embodiment of a 32-bit Task State Segment structure.

FIG. 7 is a block diagram of an example embodiment of a 64-bit Task State Segment structure.

FIG. 8 is a block diagram of an embodiment of a processor that is operative to perform an embodiment of a call procedure instruction and an embodiment of a return from procedure instruction.

1. DETAILED DESCRIPTION OF EMBODIMENTS

Disclosed herein are shadow stack protection instructions, processors to execute the instructions, methods performed by the processors when processing or executing the instructions, and systems incorporating one or more processors to process or execute the instructions. Also disclosed is shadow stack protection logic. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
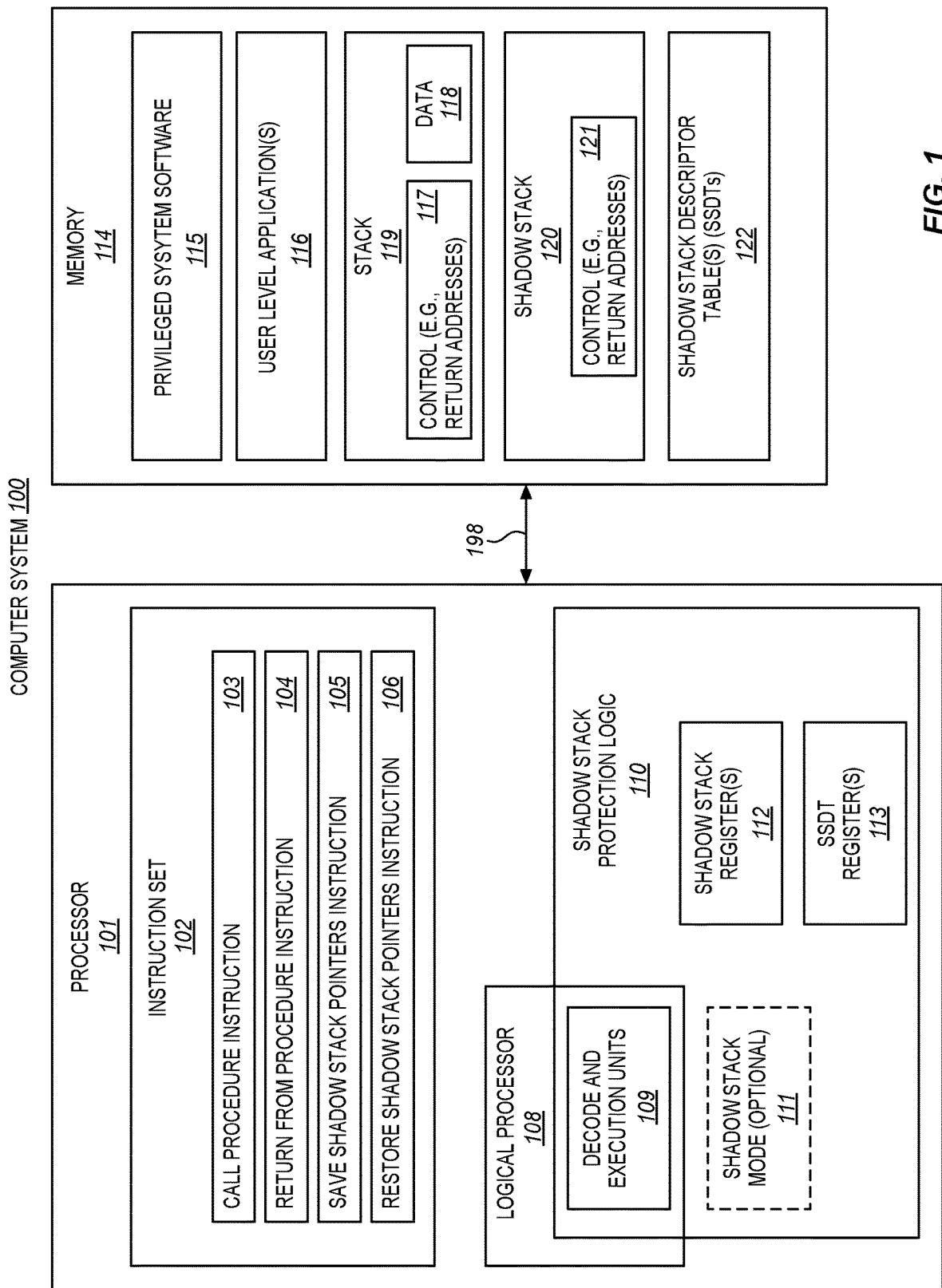
FIG. 1 is a block diagram of an embodiment of a computer system in which embodiments of the invention may be implemented.

FIG. 1 is a block diagram of an embodiment of a computer system 100 in which embodiments of the invention may be implemented. In various embodiments, the computer system may represent a desktop computer system, a laptop computer system, a notebook computer, a tablet computer, a netbook, a portable personal computer, a smartphone, a cellular phone, a server, a network element (e.g., a router or switch), a smart television, a nettop, a set-top box, a video game controller, a media player, or another type of computer system or electronic device.

The computer system includes a processor 101 and a memory 114. When deployed together in a system, the processor and the memory may be coupled with one another by an interconnection mechanism 198. The interconnection mechanism may include one or more buses or other interconnects, one or more hubs or other chipset components, and combinations thereof. Various ways of coupling processors with memories known in the arts are suitable. Although the memory is shown in the illustrated embodiment, other embodiments pertain to the processor alone not coupled with the memory (e.g., is not deployed in a computer system). Examples of different types of memory include, but are not limited to, dynamic random access memory (DRAM), flash memory, and other types of memory commonly used for main memory.

The memory may store privileged system software 115. Examples of suitable privileged system software include, but are not limited to, one or more operating systems, a virtual machine monitor (VMM), a hypervisor, and the like, and combinations thereof. The memory may also store one or more user-level applications 116. In some embodiments, the user-level applications may optionally include one or more user-level multithreaded application. As will be explained further below, such user-level multithreaded applications may optionally use instructions disclosed herein to help increase the efficiency of performing user-level multithreading and/or performing user-level task switches.

During operation, the memory may also store a stack 119. The stack is sometimes referred to as the call stack, the data stack, or just the stack. The stack may represent a stack type data structure that is operative to store both data 118 and control 117. The data may represent any of a wide variety of different types of data that software wants to push onto the stack (e.g., parameters and other data passed to subroutines, etc.). Commonly, the control may include one or more return addresses for one or more previously performed procedure calls. These return addresses may represent instruction addresses where the called procedure is to return control flow to when the called procedure finishes and returns.

As discussed in the background section, in return-oriented programming (ROP), jump-oriented programming (JOP), and other control flow subversion attacks, the attackers often seek to gain control of the stack in order to hijack program control flow. One factor that may tend to make the conventional data stack more vulnerable to ROP, JOP, and other control flow subversion attacks is that stack generally stores both the data 118 and the control 117 (e.g., data and return addresses are commonly mixed together on the same stack). Another factor that may tend to make the conventional stack more vulnerable to such attacks is that switching of the stack may generally be performed as an unprivileged operation. Both of these factors may tend to increase the exposure to control flow subversion due to bugs that allow the stack pointer and/or control flow information (e.g., return addresses) to be modified (e.g., to point to malware/attacker controlled memory).

In some embodiments, one or more shadow stacks 120 may be included and used to help to protect the stack 119 from tampering and/or to help to increase computer security. The shadow stack(s) may represent one or more additional stack type data structures that are separate from the stack 119. As shown, in some embodiments, the shadow stack(s) may be used to store control information 121 but not data (e.g., not parameters and other data of the type stored on the stack that user-level application programs would need to be able to write and modify). The control information stored on the shadow stack(s) may represent return address related information (e.g., actual return addresses, information to validate return addresses, other return address information). As one possible example, the shadow stack(s) may be used to store copies of any return addresses that have been pushed on the stack 119 when functions or procedures have been called (e.g., a copy of each return address in the call chain that has also been pushed onto the regular call stack). In some embodiments, each shadow stack may also include a shadow stack pointer (SSP) that is operative to identify the top of the shadow stack. In some embodiments, the shadow stack(s) may optionally be configured for operation individually in unprivileged user-level mode (e.g., a ring 3 privilege level) or in a privileged or supervisor privilege level mode (a ring 0, ring 1, or ring 2 privilege level). In one aspect, multiple shadow stacks may potentially be configured in a system, but only one shadow stack per logical processor at a time may be configured as the current shadow stack.

As shown, the shadow stack(s) 120 may be stored in the memory 114. In some embodiments, current or active shadow stack(s) may be defined by a linear address range to help detect and prevent stack overflow and/or stack underflow when push and/or pop operations are performed on the shadow stack. In some embodiments, to help provide additional protection, the shadow stack(s) may optionally be stored in a protected or access controlled portion of the memory that the unprivileged user-level applications 116 have restricted and/or incomplete access to. Different ways of providing suitable protected portions of memory for storing the shadow stack(s) are possible. In some embodiments, the shadow stack(s) may optionally be stored in a portion of the memory that is protected by paging access controls. For example, the privileged system software 115 (e.g., an operating system) may configure access permissions (e.g., read-write-execute access permissions) in page table entries corresponding to pages where the shadow stack(s) are stored in order to make the pages readable but not writable or executable. This may help to prevent user-level instructions, such as store to memory instructions, move to memory instructions, and the like, from being able to write to or modify data in the shadow stack(s). As another option, in some embodiments, the shadow stack(s) may optionally be stored in a portion of the memory that is protected with similar access control protections as those used for secure enclaves in Intel® Software Guard Extensions (SGX) secure enclaves, or other protected containers, isolated execution environments, or the like.

Referring again to FIG. 1, in some embodiments, the processor 101 may be a general-purpose processor (e.g., of the type commonly used as a central processing unit (CPU) in desktop, laptop, or other computer systems). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

In some embodiments, the processor may have one or more instructions and logic to help manage and protect the shadow stack(s). The processor has an instruction set 102. The instruction set is part of the instruction set architecture (ISA) of the processor and includes the native instructions that the processor is operative to execute. The instructions of the instruction set may represent macroinstructions, assembly language instructions, or machine-level instructions that are provided to the processor for execution, as opposed to microinstructions, micro-operations, or other decoded instructions or control signals that have been decoded from the instructions of the instruction set.

As shown, in the illustrated embodiment, the instruction set includes an embodiment of a call procedure or call instruction 103. The instruction set also includes an embodiment of a return from procedure or return instruction 104. The instruction set also includes an embodiment of a save shadow stack pointers instruction 105. The instruction set also includes an embodiment of a restore shadow stack pointers instruction 106. In other embodiments, the processor may instead optionally include as few as only any single one of these instructions. Embodiments pertain to a processor to perform (e.g., decode and execute) any one or more of these instructions. Other embodiments pertain to a method of performing (e.g., decoding and executing) any one of these instructions.

In some embodiments, the processor may include at least one processing element or logical processor 108. For simplicity, only a single logical processor is shown, although it is to be appreciated that the processor may optionally include other logical processors. Examples of suitable logical processors include, but are not limited to, cores, hardware threads, thread units, thread slots, and other logical processors. The logical processor may be operative to process instructions of the instruction set. The logical processor may have a pipeline or logic to process instructions. By way of example, each pipeline may include an instruction fetch unit to fetch instructions, an instruction decode unit to decode instructions, execution units to execute the decoded instructions, registers to store source and destination operands of the instructions, and the like. The scope of the invention is not limited to any known type or design of the pipeline. In some embodiments, the logical processor may be operative to process (e.g., decode, execute, etc.) any one or more of the call instruction, the return instruction, the save shadow stack pointers instruction, and the restore shadow stack pointers instruction.

As shown, at least some of the logic of the at least one processing element or logical processor 108 may be part of shadow stack protection logic 110 of the processor. In some embodiments, the shadow stack protection logic may also include an optional configurable shadow stack mode 111. The shadow stack mode may be operative to be configured to alternately enable and disable use of the shadow stack. Alternatively, the shadow stack may optionally always be enabled and the shadow stack mode may optionally be omitted. The shadow stack protection logic may also include an embodiment of one or more shadow stack registers 112. The shadow stack register(s) may be operative to specify details about the current shadow stack.

The shadow stack protection logic may also include an embodiment of one or more shadow stack descriptor table (SSDT) registers 113. The SSDT register(s) may be operative to specify details about one or more SSDTs 122. As shown, the SSDTs may be stored in the memory. In some embodiments, the SSDT(s) may be stored in a same or similar type of protected memory as the shadow stack(s). In some embodiments, the SSDT(s) may represent tables or other data structures that are operative to store information or details about shadow stack(s) that a corresponding program can use and/or switch between. By way of example, the privileged system software (e.g., an operating system) may store details about the shadow stacks in the SSDTs. In some embodiments, the processor may use the SSDTs to establish the current shadow stack and control access to the shadow stacks. By way of example, an SSDT may have multiple entries and each entry may define a range of a corresponding shadow stack that the program is allowed to use during program execution.

Figure 2:
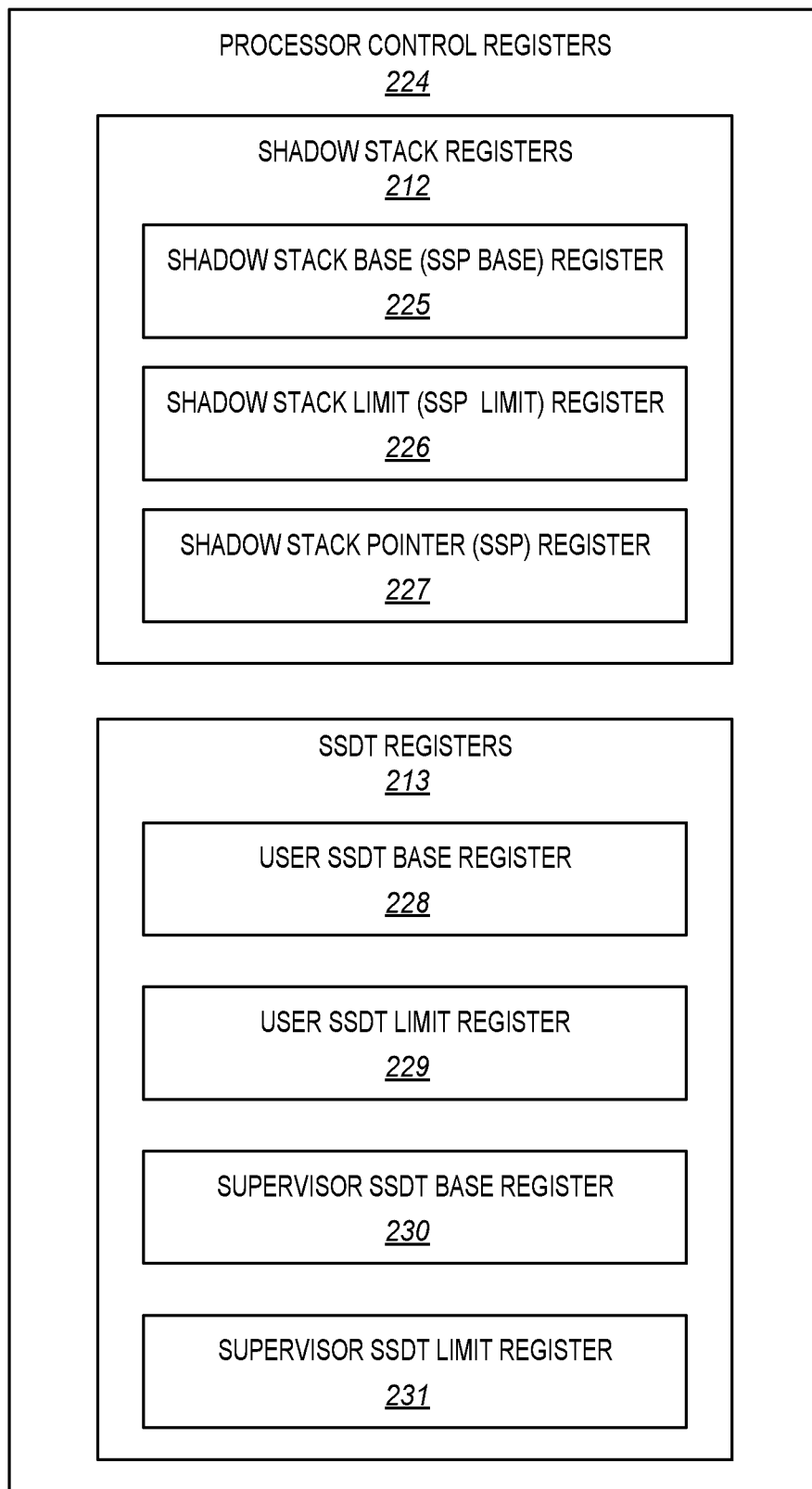
FIG. 2 is a block diagram of an embodiment of a set of shadow stack registers and an embodiment of a set of shadow stack descriptor table registers.

FIG. 2 is a block diagram of an embodiment of a set of shadow stack registers 212 and an embodiment of a set of SSDT registers 213. The shadow stack and SSDT registers may be included in a set of control registers 224 of a processor.

The shadow stack registers may be operative to specify the valid range of the current or active shadow stack that is used to protect and control access to the portion of memory used to store the current or active shadow stack. In some embodiments, the range may be specified by a linear address range. The shadow stack registers include a shadow stack base (SSP base) register 225, a shadow stack limit (SSP limit) register 226, and a shadow stack pointer (SSP) register 227. The SSP base register may be operative to store the base of the shadow stack. In one aspect, the SSP base may be the lowest linear address of the shadow stack. The SSP limit register may be operative to store the limit of the shadow stack. In one aspect, the SSP base may be the highest linear address of the shadow stack. The SSP base to SSP limit may together designate a range of memory as being a shadow stack. Memory access controls in the processor (e.g., a memory management unit, etc.) may use the SSP base and SSP limit to control access to the shadow stack. In some embodiments, user-level store to memory instructions and the like may not be able to write to the shadow stack. Attempts to write to or modify the shadow stack range may be prevented by hardware of the processor (e.g., an exception may be taken). The SSP register may be operative to store the address of the current top of the shadow stack. For example, the SSP register may store a linear address representing the current top of the shadow stack which is between the SSP base and (SSP limit-1).

The SSDT registers 213 may be operative to specify valid ranges of the current or active SSDTs that are used to protect and control access to the portion of memory used to store the current or active SSDTs. In some embodiments, there may be two different types of SSDT active in the processor at a given time. Namely, there may be a current or active privileged-level or supervisor SSDT (SSDT-S), and a current or active user-level SSDT (SSDT-U). In some embodiments, two registers may be used to program each of these different types of SSDT into the processor. In some embodiments, the SSDT registers may include a first pair of registers 228, 229 to specify the valid range of the current or active user-level SSDT (SSDT-U), and a second pair of registers 230, 231 to specify the valid range of the current or active supervisor SSDT (SSDT-S). A user SSDT base register 228 may specify a base for the SSDT-U, for example, as a page aligned (e.g., 4K page aligned) lowest linear address. A user SSDT limit register 229 may specify a limit for the SSDT-U, for example, as a page aligned highest linear address. A supervisor SSDT base register 230 may specify a base for the SSDT-S, for example, as a page aligned lowest linear address. A supervisor SSDT limit register 231 may specify a limit for the SSDT-S, for example, as a page aligned highest linear address. The supervisory SSDT (SSDT-S) may be programmed into the processor once by the privileged system software (e.g., an operating system) and generally thereafter may not need to be changed. There may be a different user SSDT (SSDT-U) per user process that is made active when scheduling the new user process.

Figure 3:
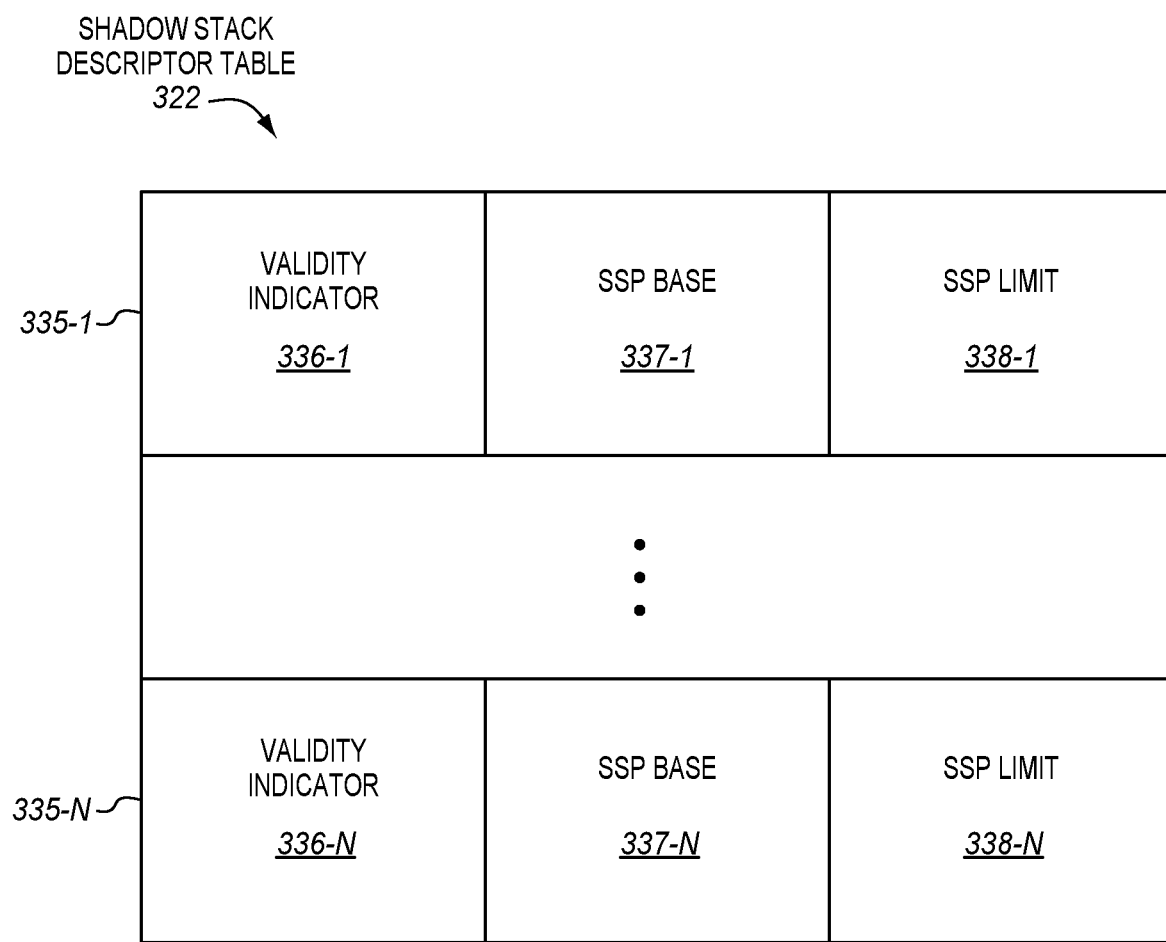
FIG. 3 is a block diagram of an embodiment of a shadow stack descriptor table.

FIG. 3 is a block diagram of an embodiment of an SSDT 322. The SSDT may represent a table or other data structure that may be stored in memory. The SSDT may be operative to store information or details about one or more shadow stacks that a corresponding program is allowed to use and/or switch between. By way of example, an operating system or other privileged system software may store ranges for each of the allowed shadow stacks in the SSDT. The SSDT may thereafter be examined (e.g., by a processor) to determine the allowed range of the shadow stack and control access to the shadow stack.

The illustrated SSDT is arranged as a table with a plurality of rows and columns. The different rows may represent different entries that each correspond to a different valid or invalid shadow stack that a corresponding program is allowed to use during program execution. In the illustrated example, there is a first entry 335-1 through an Nth entry 335-N, where the number of entries (N) may be any appropriate number desired for the particular implementation. By way of example, each application may have its own shadow stack defined by an entry and its SSP base and SSP limit. The illustrated SSDT has three columns.

A first column stores validity indicators for the corresponding entries. As shown, there may be a first validity indicator 336-1 for the first entry and an Nth validity indicator 336-N for the Nth entry. Each validity indicator may be operative to indicate whether the corresponding shadow stack is valid or invalid. For example, each validity indicator may have a first value (e.g., be set to binary one) to indicate the corresponding shadow stack is valid, or may have a second different value (e.g., be cleared to binary zero) to indicate the corresponding shadow stack is invalid.

A second and third column specify or store valid ranges for the shadow stacks. Specifically, the second column stores shadow stack bases (SSP bases) and the third column stores shadow stack limits (SSP limits). As shown, there may be a first SSP base 337-1 for the first entry and an Nth SSP base 337-N for the Nth entry. Likewise, there may be a first SSP limit 338-1 for the first entry and an Nth SSP limit 338-N for the Nth entry. In some embodiments, the SSP bases and SSP limits may respectively represent the lowest and highest linear addresses of the corresponding shadow stacks. The data in the first, second, and third columns may alternatively be rearranged variously in other embodiments. Moreover, in other embodiments, other data structures or data arrangements entirely may optionally be used besides such table-like structures or arrangements.

Figure 4:
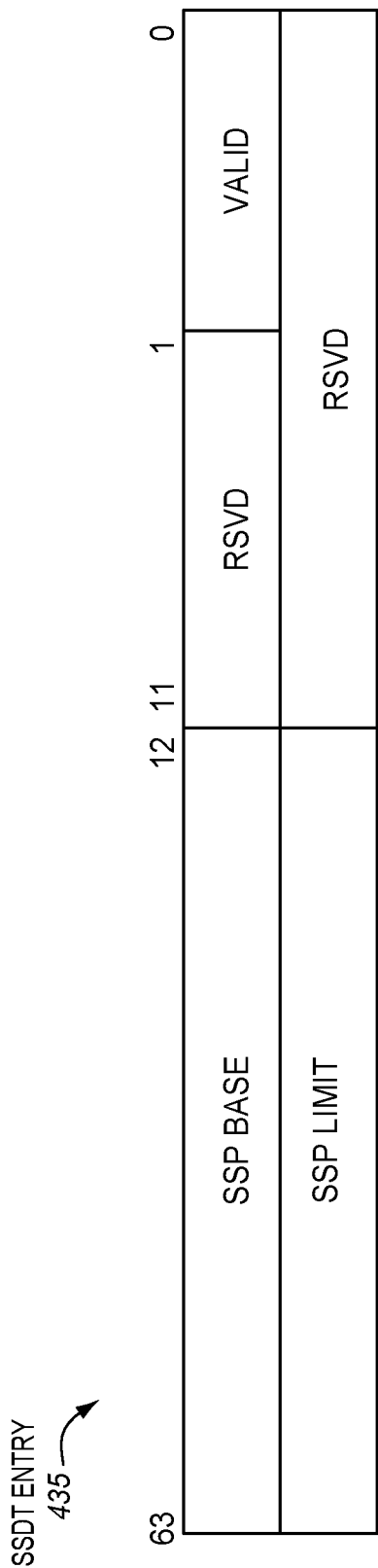
FIG. 4 is a block diagram of one particular example embodiment of a suitable shadow stack descriptor table (SSDT) entry.

FIG. 4 is a block diagram of one particular example embodiment of a suitable SSDT entry 435. The particular illustrated SSDT entry is sixteen bytes wide. The least significant bit, Bit[0], represents and/or is used to store a validity indicator. The validity indicator has a valid indication when bit[0] is set to binary one and has an invalid indication when bit[0] is cleared to binary zero. The opposite convention is alternatively also possible. Bits [11:1] and bits [74:64] may represent presently reserved bits (rsvd). In one particular embodiment, the entry may be valid when bit[0] is set to binary one and all reserved bits in bits [74:64] and [11:1] are cleared to binary zero, or otherwise may be invalid. Alternatively, the reserved bits may optionally be ignored. Bits [63:12] represent and/or are used to store a SSP base. Bits [127:75] represent and/or are used to store a SSP limit. As previously mentioned, the SSP base and SSP limit may be used to specify or define the valid range of a shadow stack that corresponds to the entry. In other embodiments, other sized SSDT entries may optionally be used, and the validity indicator, SSP base, and SSP limit may optionally be rearranged or repositioned in various different ways.

Figure 5:
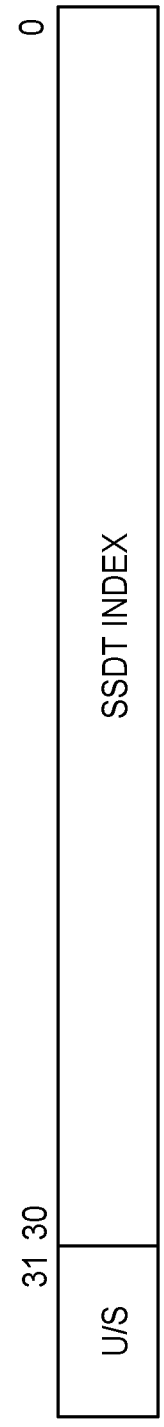
FIG. 5 is a block diagram of an example embodiment of a shadow stack descriptor table selector.

A given entry or row of an SSDT may be indexed using an SSDT selector. FIG. 5 is a block diagram of an example embodiment of an SSDT selector 540. The particular illustrated SSDT selector is a 32-bit number. Alternatively, SSDT selectors may optionally be either wider or narrower than 32-bits. Bit [31] of the particular illustrated SSDT selector stores or represents a user-supervisor indicator. When bit [31] is set to binary one the user-supervisor indicator may have a user indication. When bit [31] is cleared to binary zero the user-supervisor indicator may have a supervisor indication. The opposite convention is alternatively also possible. Bits [30:0] of the particular illustrated SSDT selector stores or represents an SSDT index. The SSDT index may be used to index into an SSDT and/or select a particular row or entry of an SSDT. When the user-supervisor indicator has a user indication the SSDT index may index into the user SSDT (SSDT-U), whereas when the user-supervisor indicator has a supervisor indication the SSDT index may index into the supervisor SSDT (SSDT-S). In some embodiments, SSDT selector may only be valid and/or only permitted to select or index an SSDT entry when the SSDT index in bits [30:0] is within the allowed range or bounds of the corresponding SSDT. Moreover, the SSDT selector may only select or indicate a valid shadow stack of the selected or indexed SSDT entry is valid (e.g., bit [0] is set to binary one and the reserved bits are all cleared).

Shadow stack selection information may be stored in different places in different embodiments. As one possible example, in some embodiments, shadow stack selection may be stored in a Task State Segment (TSS) structure in certain Intel® Architecture compatible computers. Alternatively, in other embodiments, shadow stack selection information may instead be included in a different data structure in memory. In still other embodiments, shadow stack selection information may instead be included in control registers of the processor. A combination of such approaches is also potentially suitable.

FIG. 6 is a block diagram of an embodiment of an example embodiment of a 32-bit Task State Segment (TSS) structure 645. The TSS may represent a hardware managed data structure in memory on Intel® Architecture compatible computers that may be used to store information about tasks. The processor and privileged system software may use the TSS and the information stored therein to perform stack switches and/or task switches. The processor may have a task register (e.g., a segment register to store a segment selector) that may point to or indicate a valid TSS segment descriptor. To enhance security, the TSS may be stored in memory to which access is controlled and/or that is accessible only to privileged level software.

If an operating system or other privileged system software uses the processors privilege-level protection mechanism, the task execution space may include different stacks (e.g., call stacks used to store both control and data) for different privilege levels. As shown, the 32-bit TSS has three 32-bit stack pointers, labeled ESP0, ESP1, and ESP2 that are offsets in the SS0, SS1 and SS2 stack segments respectively. In other implementations, fewer or more stack pointers may optionally be used. The three 32-bit stack pointers may point to or identify three different stacks for three different corresponding privilege levels. Specifically, ESP0 may correspond to privilege-level zero, ESP1 may correspond to privilege-level one, and ESP2 may correspond to privilege-level two. The 32-bit stack pointers may be used to identify the appropriate stack when privilege-level changes are made in the processor when operating in a 32-bit mode. As shown, the 32-bit TSS also has three corresponding 32-bit stack segment selectors, labeled SS0, SS1, and SS2. As one example, when the processor transitions from user-level to privilege-level zero, the processor may retrieve the stack pointer ESP0, and stack segment selector SS0, appropriate for the target privilege-level zero, and store their values into the ESP and SS registers of the processor.

In some embodiments, if the operating system or other privileged system software uses the processors privilege-level protection mechanism, there may also be different shadow stacks for different privilege levels. As shown, in some embodiments, the 32-bit TSS may also have three 32-bit shadow stack selectors, labeled SSDT selector 0, SSDT selector 1, and SSDT selector 2. In other implementations, fewer or more shadow stack selectors may optionally be used. The three 32-bit shadow stack selectors may point to, or otherwise identify, three different corresponding shadow stack descriptor table (SSDT) entries for three different corresponding privilege levels. For example, SSDT selector 0 may identify an SSDT entry of a shadow stack to be used at privilege-level zero, SSDT selector 1 may identify an SSDT entry of a shadow stack to be used at privilege-level one, and SSDT selector 2 may identify an SSDT entry of a shadow stack to be used at privilege-level two. The SSDT entries may be used to store shadow stack bases (SSP bases) and limits (SSP limits) for different allowed shadow stacks for the corresponding process or task. The 32-bit shadow stack selectors (SSDT selector 0, SSDT selector 1, and SSDT selector 2) may be used to identify the appropriate SSDT entries for the target privilege level when there are privilege-level changes in the processor when operating in a 32-bit mode. For example, when the processor transitions from user-level to privilege-level zero, the processor (in addition to retrieving ESP0 and SS0) may retrieve the 32-bit shadow stack selector SSDT selector 0 appropriate for privilege-level zero. The retrieved 32-bit shadow stack selector may point to the corresponding SSDT entry where a shadow stack base (SSP base) and shadow stack limit (SSP limit) may be obtained. This may allow different privilege levels to use different shadow stacks, and also may allow different shadow stacks to be used for different processes. Accordingly, the 32-bit shadow stack selectors in the TSS may be used to switch shadow stacks when there are privilege level changes in the processor. The 32-bit TSS also includes a TSS SSP 649 and a TSS SSDT selector 648 that are used to establish the shadow stack when a task is dispatched for execution through the corresponding TSS. When the processor performs a task switch it may save the SSP of the current task into the TSS SSP field of the TSS of the current task. Subsequently the processor may load the TSS SSDT selector from the TSS of the new task and use it to locate the SSP base and SSP limit for the shadow stack of the new task. The SSP for the new task may then be established using the value from the TSS SSP field of the TSS of the new task. The illustrated locations and arrangements of the SSDT selectors, the TSS SSP, and the TSS SSDT are not required. In other embodiments, these fields may optionally be located elsewhere and rearranged variously.

The 32-bit TSS also has data fields to perform task switches. Representatively, the tasks may represent units of work that the processor can dispatch, execute, and suspend. By way of example, the tasks may be used to execute one or more of a program, a task or process, an operating-system service utility, an interrupt or exception handler, or a kernel or executive utility. In one aspect, task switches may be performed when call procedure instructions are performed, jump to procedure instructions are performed, interrupts or exceptions occur, or otherwise. When a task switch is performed from a current task to a new task, the state of the current task may be saved in a TSS that corresponds to the current task, and the state of the new task may be loaded or retrieved from a TSS that corresponds to the new task. As shown, the 32-bit TSS may include state save fields 646 to store different types of processor state. For example, such fields may store the CR3 or page directory base register (PDBR), the instruction pointer (EIP), the EFLAGS register, the general-purpose registers (e.g., EAX, ECX, EDX, etc.), the segment selectors (e.g., ES, CS, SS, etc.). The 32-bit TSS may also have other fields 647 which for simplicity are not described herein.

FIG. 7 is a block diagram of an example embodiment of a 64-bit TSS structure 745. The 64-bit TSS has certain similarities to the 32-bit TSS. To avoid obscuring the description, the different or new features of the 64-bit TSS will primarily be described.

In 64-bit mode, as in 32-bit mode, if an operating system or other privileged system software uses the processors privilege-level protection mechanism, the task execution space may include different stacks (e.g., call stacks used to store both control and data) for different privilege levels. As shown, the 64-bit TSS has three 64-bit stack pointers, labeled RSP0, RSP1, and RSP2. Each of the 64-bit stack pointers is divided into upper and lower 32-bit portions. The three 64-bit stack pointers may roughly correspond to the 32-bit stack pointers ESP0, ESP1, ESP2, respectively. In other implementations, fewer or more stack pointers may optionally be used. RSP0 may correspond to privilege-level zero, RSP1 may correspond to privilege-level one, and RSP2 may correspond to privilege-level two. The 64-bit stack pointers may be used to identify the appropriate stack when privilege-level changes occur in the processor while operating in a 64-bit mode.

In some embodiments, if the operating system or other privileged system software uses the processors privilege-level protection mechanism, there may also be different shadow stacks for different privilege levels. As shown, in some embodiments, the 64-bit TSS may also have three 64-bit shadow stack selectors, labeled SSDT selector 0, SSDT selector 1, and SSDT selector 2. In other implementations, fewer or more shadow stack selectors may optionally be used. Each of the three 64-bit shadow stack selectors may point to, or otherwise identify, a different corresponding shadow stack descriptor table (SSDT) entry at a different corresponding level of execution privilege. SSDT selector 0 may point to an SSDT entry of a shadow stack to be used at privilege-level zero, SSDT selector 1 may point to an SSDT entry of a shadow stack to be used at privilege-level one, and SSDT selector 2 may point to an SSDT entry of a shadow stack to be used at privilege-level two. The 64-bit shadow stack selectors may be used to identify the appropriate SSDT entries for the target privilege level when privilege-level changes occur in the processor while operating in a 64-bit mode. As previously described, the identified SSDTs may store shadow stack bases (SSP bases) and SSP limits (SSP limits) for different allowed shadow stacks for the corresponding task or process.

In 64-bit mode there is also a mechanism to switch stacks on interrupts known as an interrupt stack table (IST). This mechanism may allow interrupt handlers to use different stacks (e.g., call stacks that store both control and data). The 64-bit TSS includes seven interrupt stack table selector fields IST1 through IST7. Each of these fields has a lower half and a higher half. These seven interrupt stack selector fields may therefore allow up to seven different stacks to be used for interrupt handling. The interrupt descriptor table entry that is used to call the interrupt or exception handler may be programmed with an IST index that is used to select one of the seven stacks from the IST.

In some embodiments, a mechanism may also optionally be used to switch shadow stacks during interrupt or exception handling. In some embodiments, the 64-bit TSS may optionally include seven interrupt shadow stack table SSDT selectors for each IST index IST1-IST7. Each of these fields may be used to specify a shadow stack to be used for interrupt handling. These seven interrupt shadow stack selector fields may therefore allow up to seven different shadow stacks to be used for interrupt handling. By way of example, when an interrupt or exception occurs, both an interrupt stack table selector field (e.g., IST3) may be used to select or identify a new stack, and an interrupt shadow stack table selector fields (e.g., SSDT selector IST3) may be used to select or identify a new shadow stack.

The illustrated locations and arrangements of the SSDT selectors and SSDT selectors IST1-IST7 are not required. In other embodiments, these fields may optionally be located elsewhere and rearranged variously.

Now, although the 32-bit mode and the 32-bit TSS include hardware managed task switch capabilities, most present day major operating systems do not use these hardware managed task switch capabilities. Accordingly, the 64-bit TSS omits many of these hardware managed task switch capabilities. When a task switch is performed from a current task to a new task, the state of the current task is not saved in the 64-bit TSS, and the state of the new task is not retrieved from the 64-bit TSS. The 64-bit TSS does not include the state save fields 646 included in the 32-bit TSS.

FIG. 8 is a block diagram of an embodiment of a processor 801 that is operative to perform an embodiment of a call procedure instruction 803 and an embodiment of a return from procedure instruction 804. To simplify the description, the call procedure instruction will often be referred to simply as a call instruction, and the return from procedure instruction will often be referred to simply as a return instruction. The call and return instructions may represent instructions or control signals of an instruction set of the processor.

During operation, the processor may receive the call instruction 803. For example, the call instruction may be received from a calling procedure that is calling a subroutine, routine, handler, or the like. For example, the instruction may be received from memory over a bus or other interconnects. In some embodiments, the call instruction may explicitly specify (e.g., through one or more fields or a set of bits), or otherwise indicate (e.g., implicitly indicate), a return address 873 as a source operand. Without limitation, commonly the return address may be the address of the next instruction in the program following the call instruction. As one example, the instruction may have a source operand specification field to specify a register or other storage location where the return address is to be stored. Alternatively, the register or other storage location may optionally be implicit to the instruction (e.g., implicit to an opcode of the instruction). As yet another option, the instruction may have an immediate or other field to provide the indication of the return address. The indicated return address may either be an actual address or an offset to the return address (e.g., an offset from an instruction following the call instruction) to the return address.

The processor also includes a set of registers 872. In some embodiments, the registers may represent general-purpose registers. As shown, in some embodiments, the return address 873 may optionally be stored in the registers. Alternatively, other storage locations may optionally be used.

The processor also includes a decode unit or decoder 870. The decode unit may receive and decode the call instruction into one or more decoded instructions or control signals. The processor also includes a call execution unit 871C coupled with the decode unit 870 and the registers 872 and that is operative to be coupled with or otherwise in communication with the memory 874. The call execution unit may receive the one or more decoded instructions or control signals. The call execution unit may also receive the indicated return address 873. In some embodiments, the call execution unit may be operative in response to and/or as a result of the call instruction (e.g., in response to the one or more decoded instructions or control signals decoded therefrom) to push or otherwise store the return address, and a CS if a far call, onto a stack 875. In some embodiments, the call execution unit may also be operative in response to and/or as a result of the call instruction (e.g., in response to the one or more decoded instructions or control signals decoded therefrom) to push or otherwise store the return address, and a CS if a far call, onto a shadow stack 877.

In some embodiments, the call execution unit may be operative to push or otherwise store the return address, and the CS if a far call, onto the shadow stack, even when access permissions associated with the shadow stack indicate that the shadow stack is not writable. For example, in some embodiments, the portion of memory having the shadow stack may be protected by paging. In some embodiments, privileged system software (e.g., an operating system) may configure access permissions in page table entries for pages having the shadow stack to make them not writable (e.g., to make them read only). In some embodiments, this may be effective to prevent other store to memory, write to memory, move to memory, and such instructions of the same instruction set from being able to store or write to the shadow stack. However, the call execution unit responsive to the call instruction may be operative to store the return address on the stack even when such access permissions indicate that the shadow stack is not writable. That is, the call execution unit responsive to the call instruction may ignore the non-writable access permissions in the page table entries for the pages used for the shadow stack. However, such access protections may be effective at preventing user-level software (e.g., store to memory instructions) from being able to modify the shadow stack contents. Moreover, similar heterogeneous store capabilities may optionally instead be implemented with other different types of access permissions (e.g., of the type used to protected enclaves or other protected containers).

In some embodiments, before the call execution unit stores the return address on the shadow stack, the call execution unit may be operative to perform one or more additional security checks or protections. In some embodiments, the call execution unit may check whether shadow stacks are enabled. If the shadow stacks are enabled, then the call execution unit may proceed, or otherwise it may stop without storing the return address on the shadow stack.

In some embodiments, before pushing or storing the return address on the shadow stack, the call execution unit may be operative to check or determine whether pushing or storing the new return address would cause the shadow stack pointer (SSP) to exceed the allowed bounds defined by the shadow stack base (e.g., exceed a SSP base). For example, the call execution unit may be operative to subtract the shadow stack width needed to handle the return address (e.g., the number of bytes to be pushed) from the current SSP. The shadow stack may grow downwards, as conventional stacks commonly do. The lowest address or SSP may be used when the shadow stack is empty. Storing a return address onto the stack may decrement or decrease the shadow stack address or SSP prior to performing the store. By way of example, in certain Intel Architecture processors, the shadow stack width may be 4-bytes or 8-bytes depending on the mode. The call execution unit may be operative to determine whether the resulting SSP is less than the shadow stack base (SSP base) after decrementing the SSP by the width of the shadow stack. If so, the attempted push of the return address may be considered to be out of bounds and may not be performed. For example, a stack fault (#SS) or other exceptional condition may be asserted. Otherwise, call execution unit may push or store the return address onto the shadow stack at the resulting decremented or decreased SSP.

Such checking and protecting against the shadow stack exceeding the allowed shadow stack range may help to protect against data being stored outside of the protected shadow stack range in regular/standard unprotected memory. Otherwise, this could allow return addresses to exist outside of the protected shadow stack range where they could potentially be modified or tampered with. Accordingly, the shadow stack range may help to ensure that the call instruction is only allowed to store return addresses within the shadow stack protected range.

Subsequently, the processor may receive the return instruction 804. For example, the return instruction may be a last instruction of a called subroutine, handler, routine, or procedure that is returning control flow back to a procedure that had called it.

The decode unit 870 may receive and decode the return instruction into one or more decoded instructions or control signals. The processor includes a return execution unit 871R that is coupled with the decode unit 870 and is operative to be coupled with or otherwise in communication with the memory 874. The return execution unit may either be the same execution unit as used for the call instruction or a different execution unit. For improved clarity in the illustration, different execution units are shown, although this is not required.

In some embodiments, the return execution unit 871R may be operative in response to and/or as a result of the return instruction (e.g., in response to the one or more decoded instructions or control signals decoded therefrom) to pop or otherwise receive 882 the return address 876 (and CS in the case of a far call) from the stack 875 and pop or otherwise receive 884 the return address 878 (and CS in the case of a far call) from the shadow stack 877. In some embodiments, the return execution unit may be operative in response to and/or as a result of the return instruction to be restrictive or limiting with regard to returning control flow to the return address using or based on the return address (e.g., return address information) that was stored on the shadow stack.

In some embodiments, the return execution unit may be operative in response to and/or as a result of the return instruction to verify or ensure the integrity of the return address that was stored on the stack. For example, the return execution unit may be operative to determine whether the return addresses that were stored on the stack and shadow stack are equal, match, or are otherwise compatible. The return execution unit may be operative to compare the return address on the stack with return address information on the shadow stack (e.g., a copy of the return address, a hash of the return address, etc.). In some embodiments, the same return address may be stored on both the stack and the shadow stack so the two values should be equal or identical in order to match or be compatible. If the return address information is determined to be compatible, the return execution unit may allow a control flow transfer to the return address. For example, the return execution unit may be operative to cause the return address to be stored in an instruction pointer register 880. Conversely, if the return address information is determined to be incompatible, then the return execution unit may not allow the control flow transfer to the return address on the stack. For example, the return execution unit may be operative to take an exception 885 (e.g., a control protection exception) to a handler module (e.g., of privileged system). Advantageously, restricting or limiting the control flow transfer to the return address on the stack in the case of mismatching or incompatible information may help to prevent ROP and other control flow subversion attacks, or at least make launching them significantly harder.

Alternatively, instead of comparing the return address information that was stored on the stack and shadow stack the return execution unit may use the return address information that was stored on the shadow stack to provide protection in other ways. For example, in other embodiments, the return execution unit may be operative in response to and/or as a result of the return instruction to overwrite the return address on the stack with the return address on the shadow stack. In still other embodiments, the return execution unit may be operative to use the return address stored on the shadow stack directly to jump or otherwise return control flow transfer to the return address instead of using the return address on the stack. For example, the return address on the shadow stack may be stored in the instruction pointer register.

In some embodiments, before the return execution unit pops or otherwise retrieves the return address from the shadow stack, the return execution unit may optionally be operative to perform one or more additional security checks or protections. In some embodiments, the return execution unit may be operative to check whether shadow stacks are enabled. If the shadow stacks are enabled, then the return execution unit may proceed, or otherwise it may stop without storing retrieving the return address from the shadow stack. In some embodiments, before popping or retrieving the return address from the shadow stack, the return execution unit may be operative to check or determine whether popping or retrieving return address would read from an address beyond the allowed bounds defined by the shadow stack limit (SSP limit). The shadow stack may grow downwards, as conventional stacks commonly do. As return addresses are popped or otherwise removed from the stack, the shadow stack address or SSP may increment or otherwise increase after the content is read from the shadow stack. The return execution unit may be operative to determine whether the SSP is beyond the limit (SSP limit-1) prior to reading the first or last byte of the content from the shadow stack. By way of example, in certain Intel Architecture processors, the shadow stack width may be 4-bytes or 8-bytes depending on the mode. If so, the attempted pop or removal of a return address or data from the shadow stack may be considered to be out of bounds and may not be performed. For example, the return execution unit may assert a stack fault (#SS) or other exceptional condition. Thus an attempt to do a shadow stack operation beyond a limit of the shadow defined by privileged system software may fail and cause an exception. Otherwise, the current contents of the top of the shadow stack [SSP] may be popped or retrieved from the shadow stack.

Such checking and protecting against the shadow stack exceeding the allowed shadow stack range may help to protect against data being accessed from outside of the protected shadow stack range in regular/standard unprotected memory. Otherwise, this could allow potentially modified return addresses outside of the protected shadow stack range to be used by the return instruction. Accordingly, the shadow stack range may help to ensure that the return instruction is only allowed to retrieve return addresses from within the shadow stack protected range.

Also disclosed herein are save SSP instructions and restore SSP instructions. In some embodiments, these instructions may be used to help manage and protect the SSP during user-level or user mode thread switching. Thread switching may involve stopping the execution of a first thread (e.g., on a hardware thread, core, or other logical processor) and starting the execution of a second thread. Generally, such thread switching also involves context switching. In context switching the current context or state of the thread that is being stopped (e.g., the first thread) may be saved. Then, when the thread that was stopped is later resumed, the saved context or state may be restored so that the restarted thread may resume at the point where it left off. The shadow stack context including the SSP represents context that should also be saved and restored, and in a secure and protected way. The save SSP instructions and restore SSP instructions may help to switch shadow stacks and save and restore the SSP in a secure and protected way that does not compromise the security of the shadow stack. In some embodiments, user-level applications should not be able to manipulate the SSP arbitrarily. For example, when switching from a first thread to a second thread, it may only be allowed to switch to the same point in the second thread where execution previously left off, but not at other arbitrary points. In other words, when switching to the second thread, the user-level application program may only be able to use the same SSP which the second thread previously had when it last stopped running. Advantageously, in some embodiments, the save SSP instructions and restore SSP instructions may be user-level instructions that may be performed at an unprivileged or user-level of execution privilege. This may help to avoid needing to have privileged system software perform save and restore of the SSP and facilitate user-level multithreading.

Figure 9:
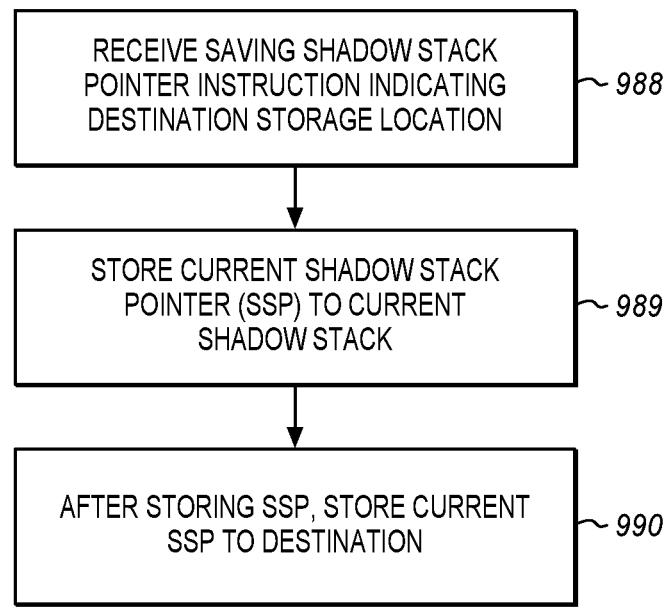
FIG. 9 is a block flow diagram of an embodiment of a method of performing an embodiment of a save shadow stack pointer instruction.

FIG. 9 is a block flow diagram of an embodiment of a method 987 of performing an embodiment of a save shadow stack pointer instruction. In various embodiments, the method may be performed by a processor, instruction processing apparatus, or other digital logic device.

The method includes receiving the save shadow stack pointer instruction, at block 988. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). In some embodiments, the save shadow stack pointer instruction may specify (e.g., explicitly specify) or otherwise indicate (e.g., implicitly indicate) a destination register, location in memory, or other storage location. By way of example, the destination storage location may optionally be a general-purpose register that may be either explicitly specified or implicitly indicated by the instruction.

At block 989, the current shadow stack pointer (SSP) may be pushed or otherwise stored to a current shadow stack in response to and/or as a result of the instruction. In some embodiments, the current SSP may be accessed from a control register of the processor and then stored to the current top of the current shadow stack.

At block 990, after storing the current SSP to the current shadow stack, the new or updated SSP (e.g., reflecting any decrementing or decreasing of the SSP due to the store or push) may be stored in the indicated destination storage location in response to and/or as a result of the instruction. Without limitation, software may preserve the SSP stored in the destination so that it can be presented again (e.g., by a restore SSP instruction) when switching back to the thread that is being stopped. This may help to allow execution to be resumed at the point where execution of the thread left off.

The illustrated method involves architectural operations (e.g., those visible from a software perspective). In other embodiments, the method may optionally include one or more microarchitectural operations. By way of example, the instruction may be fetched, decoded, scheduled out-of-order, the source operand may be accessed, an execution unit may perform microarchitectural operations to implement the instruction, etc.

Figure 10:
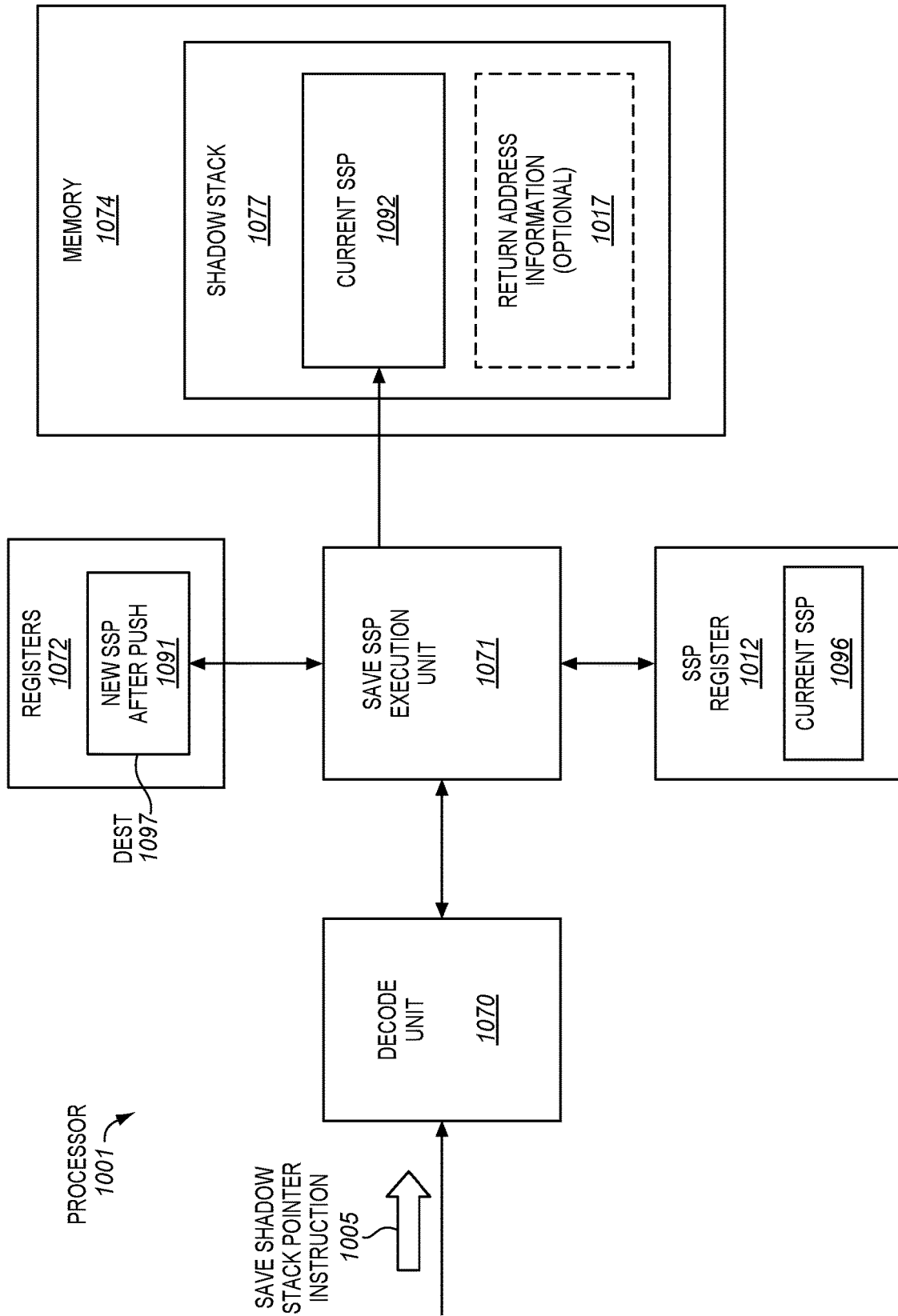
FIG. 10 is a block diagram of an embodiment of a processor that is operative to perform an embodiment of a save shadow stack pointer instruction.

FIG. 10 is a block diagram of an embodiment of a processor 1001 that is operative to perform an embodiment of a save SSP instruction 1005. In some embodiments, the processor 1001 may perform the method 987 of FIG. 9. The components, features, and specific optional details described herein for the processor 1001 also optionally apply to the method 987. Alternatively, the method 987 may be performed by and/or within a similar or different processor or apparatus. Moreover, the processor 1001 may perform methods similar to or different than the method 987.

During operation, the processor may receive the save SSP instruction 1005. For example, the instruction may be received from memory over a bus or other interconnect. The instruction may represent an instruction or control signal of an instruction set of the processor. In some embodiments, the save SSP instruction may explicitly specify (e.g., through one or more fields or a set of bits), or otherwise indicate (e.g., implicitly indicate), a destination storage location 1097 where a result is to be stored. As one example, the instruction may have a destination specification fields to specify a register, memory location, or other storage location as the destination storage location. Alternatively, one or more of these storage locations may optionally be implicit to the instruction (e.g., implicit to an opcode of the instruction). As shown, in some embodiments, the destination storage location (DEST) 1097 may optionally be a register of a set of registers 1072 (e.g., general-purpose registers) of the processor.

The processor also includes a decode unit or decoder 1070. The decode unit may receive and decode the save SSP instruction into one or more decoded instructions or control signals. The processor also includes a save SSP execution unit 1071. The save SSP execution unit may also be referred to simply as an execution unit. The execution unit is coupled with the decode unit 1070 and the registers 1072. The execution unit is also coupled with an SSP register 1012 of the processor. When the processor is deployed in a system, the execution unit may be operative to be coupled with or otherwise in communication with a memory 1074. The execution unit may receive the one or more decoded instructions or control signals.

In some embodiments, the execution unit may also be operative in response to and/or as a result of the save SSP instruction (e.g., in response to the one or more decoded instructions or control signals decoded therefrom) to retrieve or otherwise receive a current SSP 1096 from the SSP register 1012. The execution unit may also be operative in response to and/or as a result of the instruction to push or otherwise store the received current SSP 1096 onto a shadow stack 1077 as a current SSP 1092. In other words, the execution unit may save a copy of the current SSP 1096 on the shadow stack. The shadow stack may provide a secure and protected place to store the current SSP where user-level software is not able to modify it or tamper with it. The shadow stack may also optionally store return address information 1017, although this is not required.

The execution unit may also be operative in response to and/or as a result of the instruction, after storing the current SSP to the shadow stack, to store the new or updated current SSP 1091 to the destination storage location 1097 indicated by the instruction. The new SSP may reflect the decrementing or decreasing of the SSP due to the storage of the current SSP on the shadow stack. The new SSP stored in the destination represents the point where the thread stopped executing or left off. Without limitation, software may preserve the new SSP so that the new SSP may be presented when restarting or switching back to the thread at the point where the thread had previously left off. By way of example, as will be discussed further below, the new SSP may be provided as a source operand of a restore SSP instruction. However, in some embodiments, the destination storage location may not be a sufficiently protected location (e.g., the destination storage location may be a general-purpose register, location in regular/normal memory, or the like) and software may potentially be able to modify the new SSP in the destination storage location. Accordingly, as will be discussed further below, the current SSP 1092 stored on the shadow stack may be used to verify any such presented SSP (e.g., in response to and/or as a result of a restore SSP instruction).

In some embodiments, before storing the current SSP 1092 on the shadow stack, the execution unit may be operative in response to and/or as a result of the instruction to check or determine whether pushing or storing the current SSP onto the shadow stack would cause the SSP to exceed the allowed bounds defined by the shadow stack base for the current shadow stack. For example, the execution unit may be operative to subtract the shadow stack width needed to handle the current SSP (e.g., the number of bytes to be pushed) from the current SSP. The execution unit may be operative to determine whether the resulting SSP would be less than the shadow stack base. If so, the attempted push of the current SSP may be considered to be out of bounds and may not be performed. For example, a stack fault (#SS) or other exceptional condition may be asserted. Otherwise, the execution unit may store the current SSP onto the shadow stack at the resulting decremented or decreased SSP.

Figure 11:
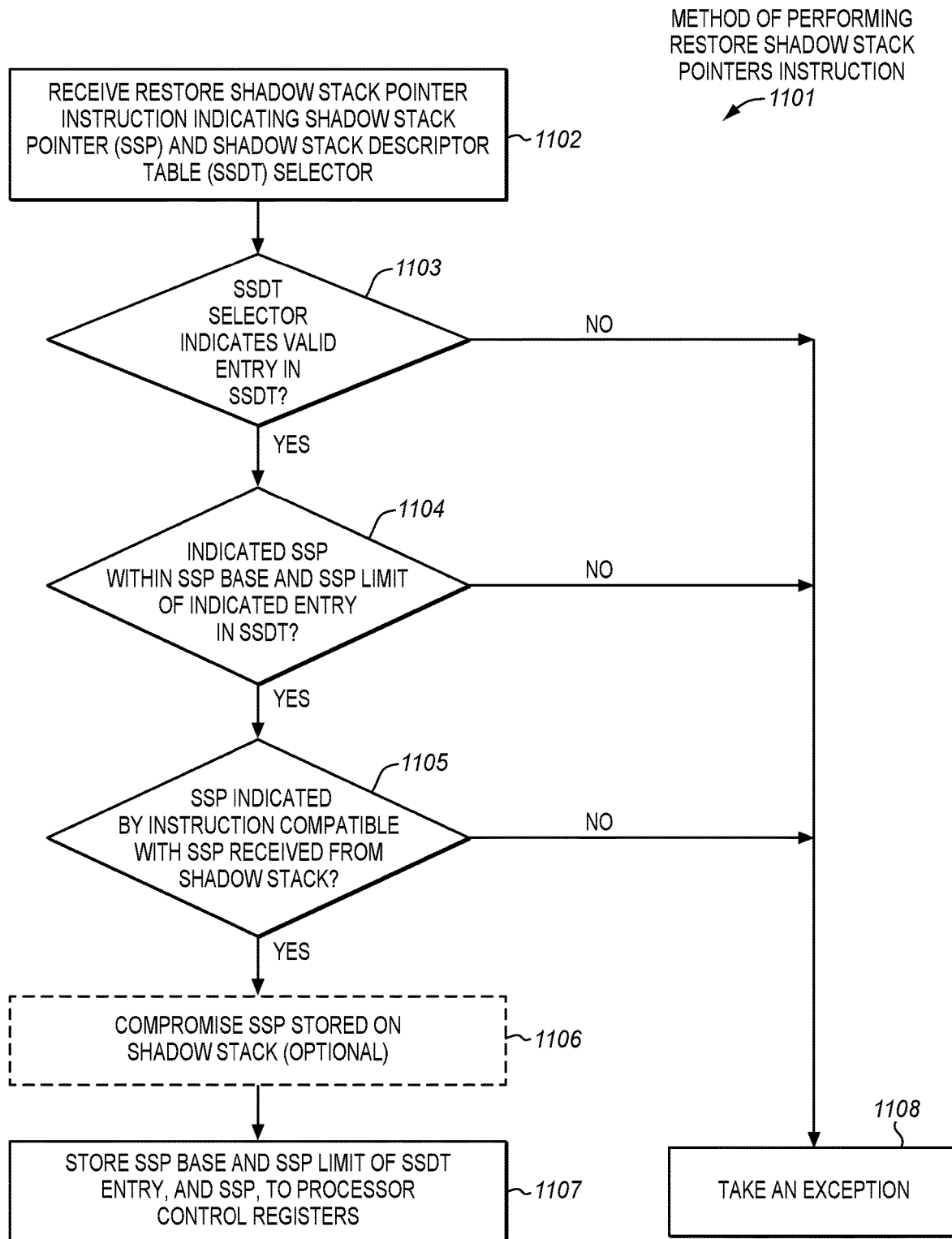
FIG. 11 is a block flow diagram of an embodiment of a method of performing an embodiment of a restore shadow stack pointer instruction.

FIG. 11 is a block flow diagram of an embodiment of a method 1101 of performing an embodiment of a restore shadow stack pointer instruction. In various embodiments, the method may be performed by a processor, instruction processing apparatus, or other digital logic device.

The method includes receiving the restore shadow stack pointer instruction, at block 1102. In some embodiments, the restore SSP instruction may specify (e.g., explicitly specify) or otherwise indicate (e.g., implicitly indicate) an SSP and may specify or otherwise indicate a shadow stack descriptor table (SSDT) selector. By way of example, the instruction may specify or indicate registers (e.g., general-purpose registers) or other storage locations having the SSP and the SSDT selector.

The method includes performing a number of verifications or protections in response to and/or as a result of the instruction.

At block 1103, a determination may be made whether the SSDT selector (e.g., the one provided by the instruction) indicates a valid entry in the SSDT. If the SSDT selector does indicate a valid entry in the SSDT (i.e., if "yes" is the determination), the method may advance to block 1104. Otherwise, (i.e., if "no" is the determination) the method may advance to block 1108.

At block 1104, a determination may be made whether the SSP indicated by the instruction is within an SSP base and an SSP limit specified in an entry of the SSDT that is indicated or selected by the SSDT selector (e.g., the one provided by the instruction). If the SSP is within the SSP base and SSP limit (i.e., if "yes" is the determination), the method may advance to block 1105. Otherwise, (i.e., if "no" is the determination) the method may advance to block 1108.

At block 1105, a determination may be made whether the SSP indicated by the instruction equals, matches, or is otherwise compatible with an SSP received from the shadow stack. In some embodiments, the SSP received from the shadow stack may be the one stored there by a preceding save SSP instruction. In other embodiments, a hash may be used for one of the SSP values such that compatibility need not be so limited as matching or equality but rather may be compatibility through a transformation (e.g., a hash). If the SSP is compatible (i.e., if "yes" is the determination), the method may advance to block 1106. Otherwise, (i.e., if "no" is the determination) the method may advance to block 1108.

The method may advance to block 1108, if any of the verifications or protections of blocks 1103, 1104, and 1105 fail. At block 1108, an exception may be taken, and the instruction may then complete without restoring shadow stack state or context.

Alternatively, the method may advance to block 1107 if all of the verifications or protections of blocks 1103, 1104, and 1105 succeed. At block 1107, shadow stack state or context may be restored in response to and/or as a result of the instruction. In some embodiments, as shown at block 1107, the SSP base and SSP limit obtained from the entry of the SSDT selected by the SSDT selector may be stored in control registers of the processor (e.g., the shadow stack registers 112). In some embodiments, as shown at block 1107, the SSP may also be stored in control registers of the processor (e.g., the shadow stack registers 112). In some embodiments, the verified SSP from the source operand of the instruction may be stored into the control register. In other embodiments, the SSP retrieved from the shadow stack may be stored into the control register.

The illustrated method involves architectural operations (e.g., those visible from a software perspective). In other embodiments, the method may optionally include one or more microarchitectural operations. By way of example, the instruction may be fetched, decoded, scheduled out-of-order, the source operand may be accessed, an execution unit may perform microarchitectural operations to implement the instruction, etc.

Figure 12:
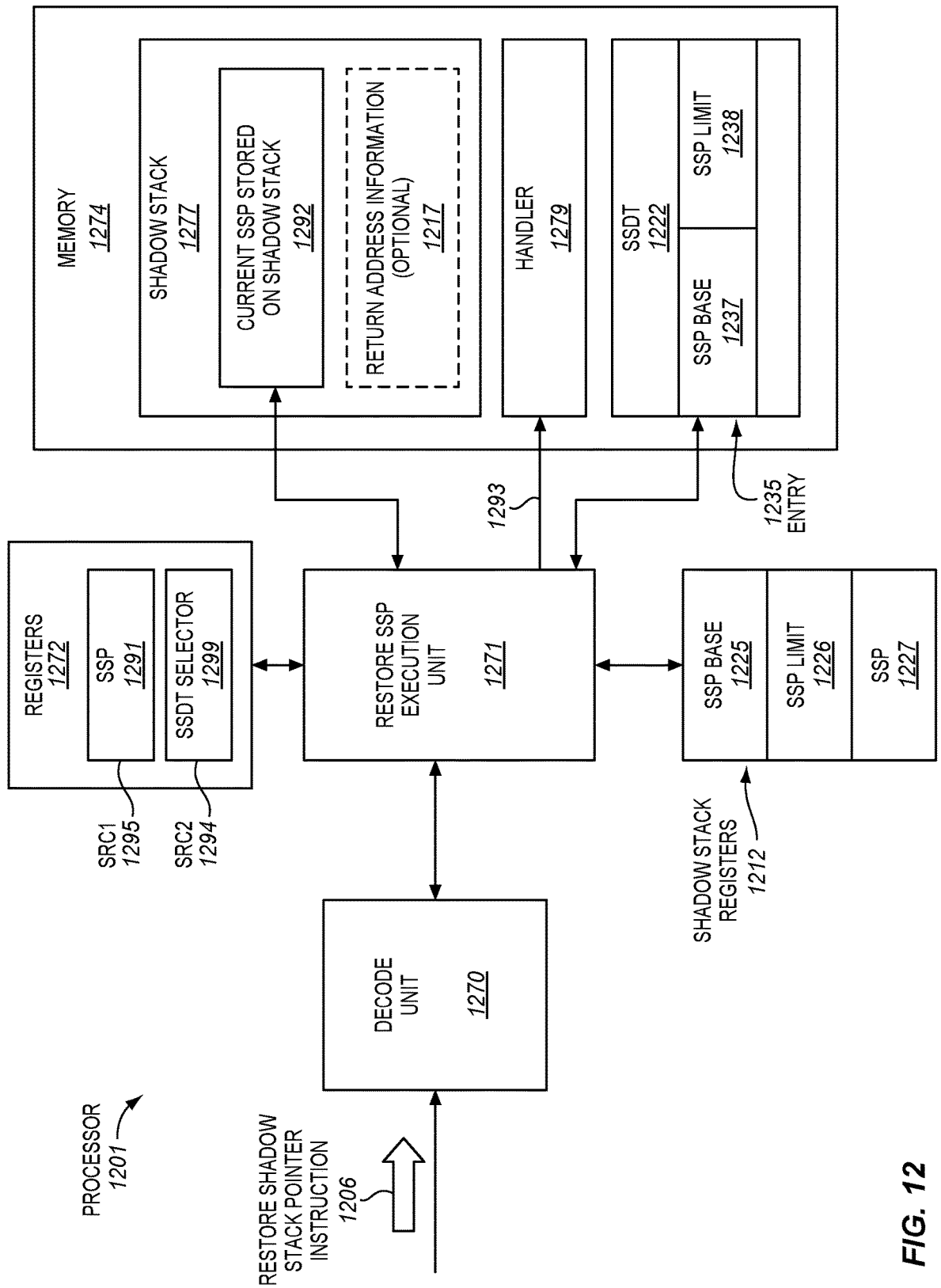
FIG. 12 is a block diagram of an embodiment of a processor that is operative to perform an embodiment of a restore shadow stack pointer instruction.

FIG. 12 is a block diagram of an embodiment of a processor 1201 that is operative to perform an embodiment of a restore SSP instruction 1206. The instruction may represent an instruction or control signal of an instruction set of the processor.

In some embodiments, the restore SSP instruction may explicitly specify (e.g., through one or more fields or a set of bits), or otherwise indicate (e.g., implicitly indicate), first source operand (SRC1) 1295 that is to store an SSP 1291, and may specify or otherwise indicate a second source operand (SRC2) 1294 that is to store a shadow stack descriptor table (SSDT) selector 1299. As one example, the instruction may have source and/or destination operand specification fields to specify registers, memory locations, or other storage locations for the operands. Alternatively, one or more of these operands may optionally be implicit to the instruction (e.g., implicit to an opcode of the instruction). As shown, in some embodiments, the first and second source operands may optionally be stored in registers of a set of registers 1272 (e.g., general-purpose registers) of the processor. Alternatively, memory locations, or other storage locations, may optionally be used for one or more of these operands.

The processor also includes a decode unit or decoder 1270. The decode unit may receive and decode the restore SSP instruction into one or more decoded instructions or control signals. The processor also includes a restore SSP execution unit 1271. The restore SSP execution unit may also be referred to simply as an execution unit. The execution unit is coupled with the decode unit and the registers. When the processor is deployed in a system, the execution unit may be operative to be coupled with or otherwise in communication with a memory 1274. The execution unit may receive the one or more decoded instructions or control signals. The execution unit may also receive the SSP 1291 and the SSDT selector 1299.

In some embodiments, the execution unit 1271 may also be operative in response to and/or as a result of the restore SSP instruction (e.g., in response to the one or more decoded instructions or control signals decoded therefrom) to performing a number of verifications or protections before restoring shadow stack context or state. In some embodiments, the execution unit may be operative to use the SSDT selector 1299 to select or indicate an entry 1235 in an SSDT 1222, and determine whether the entry is valid or invalid, in response to and/or as a result of the instruction. If the entry is not valid, the instruction may complete without restoring shadow stack state or context, and in some embodiments may take an exception 1293 (e.g., to a handler module 1279). Otherwise, the execution unit may continue performing one or more other verifications. In some embodiments, validity may be determined as mentioned above for FIG. 3 (e.g., use of values of a validity indicator and optionally reserved bits).

In some embodiments, the execution unit may be operative to determine whether the SSP 1291 indicated by the first source operand is within an SSP base 1237 and an SSP limit 1238 specified by the verified valid entry 1235 of the SSDT 1222 selected by the SSDT selector 1299 in response to and/or as a result of the instruction. If the SSP is not within the SSP base and SSP limit, the instruction may complete without restoring shadow stack state or context, and in some embodiments may take an exception 1293. Otherwise, execution unit may continue performing one or more other verifications.

In some embodiments, the execution unit may be operative to determine whether the SSP 1291 of the first source operand equals, matches, or is otherwise compatible with a current SSP 1292 stored on the shadow stack 1277 in response to and/or as a result of the instruction. In some embodiments, the SSP 1292 may have been stored on the shadow stack by a preceding save SSP instruction (e.g., instruction 1005). If they are not matching or otherwise compatible, the instruction may complete without restoring shadow stack state or context, and in some embodiments may take an exception 1293. Otherwise, in some embodiments, the execution unit may determine that the SSDT selector 1299 and SSP 1291 indicated by the instruction are sufficiently verified. Checking for such compatibility may help to ensure that the user-level application is not able to manipulate the SSP arbitrarily.

In some embodiments, the execution unit may optionally be operative to zero, invalidate, change, or otherwise compromise the current SSP 1292 stored on the shadow stack in response to and/or as a result of the instruction, although this is not required. This may help to ensure that the current SSP is used only once and cannot be reused, which may help to provide further protection.

In some embodiments, the execution unit may be operative, after sufficiently verifying the SSDT selector 1299 and SSP 1291, to store shadow stack context or state, in response to and/or as a result of the instruction. For example, in some embodiments, the execution unit may be operative to store the SSP base 1237 from the entry 1235 in an SSP base register 1225 of a set of shadow stack registers 1212 of the processor, to store the SSP limit 1238 from the entry in an SSP limit register 1226, and to store an SSP in an SSP register 1227. In some embodiments, the SSP 1291 of the first source operand may be stored in the SSP register 1227. In other embodiments, the SSP 1292 from the shadow stack may be stored in the SSP register 1227.

It is to be appreciated that this is just one illustrative example embodiment of a restore SSP instruction and a processor to perform it. In other embodiments, fewer or more verifications may optionally be performed before restoring shadow stack context depending upon the desired level of protection for the particular implementation. Other embodiments pertain to restore SSP instructions that perform any one or more of the verifications or protections described above in addition to optionally other verifications or protections.

Processors have been shown and described for FIGS. 8, 10, and 12. In some embodiments, these processors may be general-purpose processors (e.g., of the types previously described). Alternatively, the processors may be special-purpose processors (e.g., of the types previously described). The processors may have CISC, RISC, VLIW, hybrid, or other architectures, or a combination thereof.

The decode units of FIGS. 8, 10, and 12 may be operative to decode the received higher-level instruction, and output one or more relatively lower-level instructions or control signals (e.g., one or more microinstructions, micro-operations, micro-code entry points, decoded instructions or control signals, etc.), which reflect, represent, and/or are derived from the received relatively higher-level instruction. In some embodiments, the decode units may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode units may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the instructions being provided directly to the decode units, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive an instruction, which may be of a first instruction set, and may emulate, translate, morph, interpret, or otherwise convert the instruction into one or more corresponding intermediate instructions or control signals, which may be of a second different instruction set. The one or more intermediate instructions or control signals of the second instruction set may be provided to the decode units, which may decode them into one or more lower-level instructions or control signals executable by native hardware of the processor (e.g., the execution units).

The registers of FIGS. 8, 10, and 12 may represent an on-die storage locations that may be operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

The execution units of FIGS. 8, 10, and 12 may be coupled with the decode units to receive the one or more decoded or otherwise converted instructions or control signals that represent and/or are derived from the instruction that is decoded. The execution units may be operative in response to and/or as a result of the corresponding instruction (e.g., in response to one or more instructions or control signals decoded from the corresponding instruction) to perform the described operations of the corresponding instruction. The execution unit and/or the processor may include specific or particular logic (e.g., transistors, integrated circuitry, or other hardware potentially combined with firmware (e.g., instructions stored in non-volatile memory) and/or software) that is operative to perform the corresponding instruction.

To avoid obscuring the description, the processors of FIGS. 8, 10, and 12 have been shown in a simplified format. However, the processor may optionally include other processor components. For example, various different embodiments may include various different combinations and configurations of the components shown and described for any of FIGS. 13-15. All of the components of the processor may be coupled together to allow them to operate as intended.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

Figures 13A, 13B:
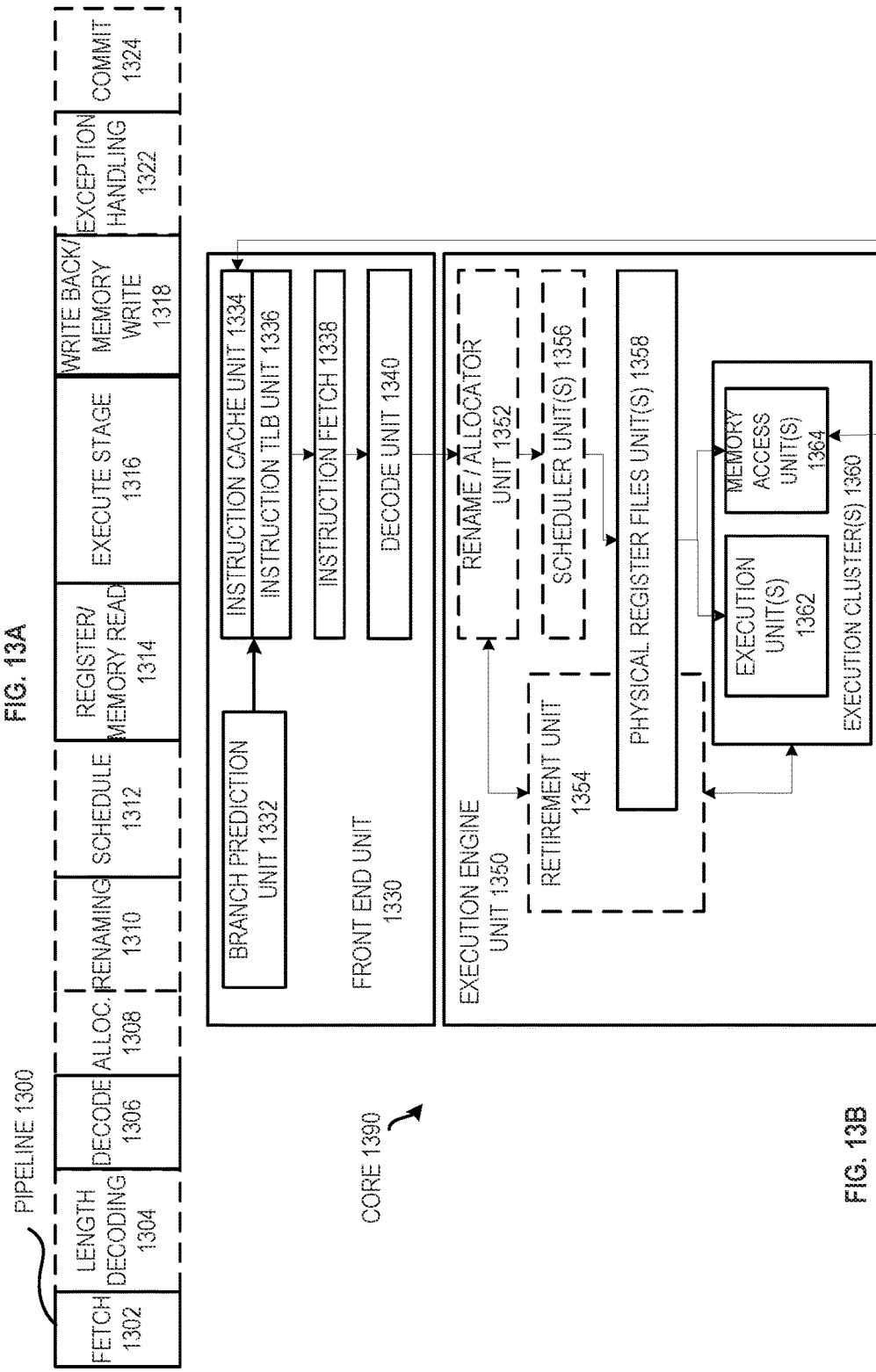
FIG. 13A is a block diagram illustrating an embodiment of an in-order pipeline and an embodiment of a register renaming out-of-order issue/execution pipeline.
FIG. 13B is a block diagram of an embodiment of processor core including a front end unit coupled to an execution engine unit and both coupled to a memory unit.

FIG. 13A is a block diagram illustrating both an exemplary in-order pipeline and an exemplary register renaming, out-of-order issue/execution pipeline according to embodiments of the invention. FIG. 13B is a block diagram illustrating both an exemplary embodiment of an in-order architecture core and an exemplary register renaming, out-of-order issue/execution architecture core to be included in a processor according to embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6)

the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 14B:
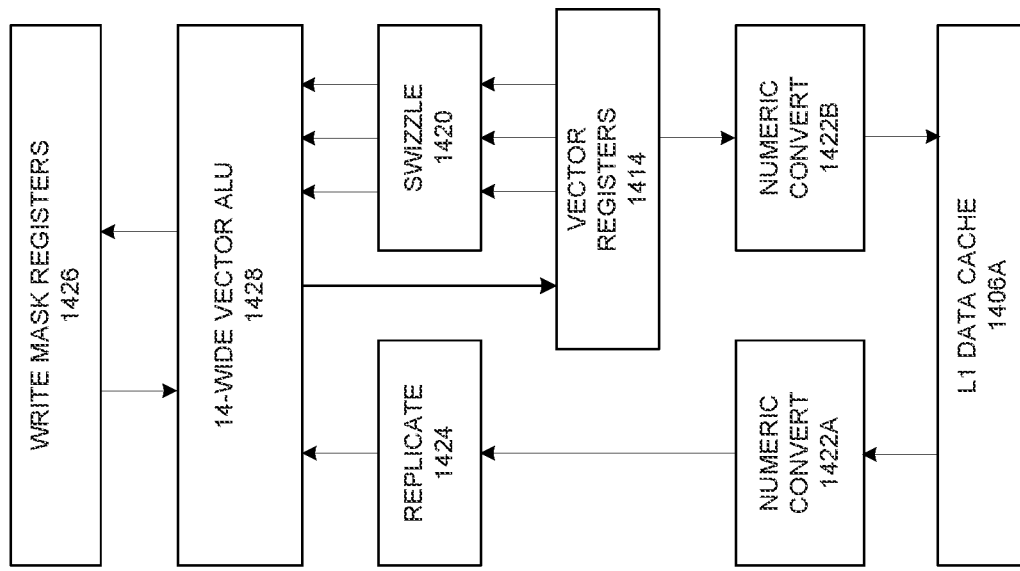
FIG. 14B is a block diagram of an embodiment of an expanded view of part of the processor core of FIG. 14A.
Figure 14A:
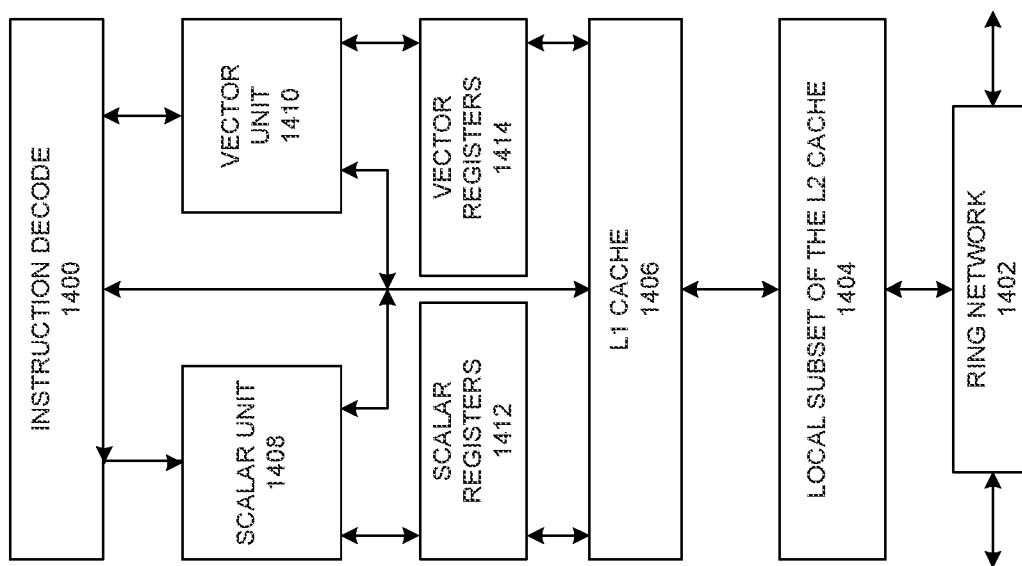
FIG. 14A is a block diagram of an embodiment of a single processor core, along with its connection to the on-die interconnect network, and with its local subset of the Level 2 (L2) cache.

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network 1402 and with its local subset of the Level 2 (L2) cache 1404, according to embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 11412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Processor with Integrated Memory Controller and Graphics

Figure 15:
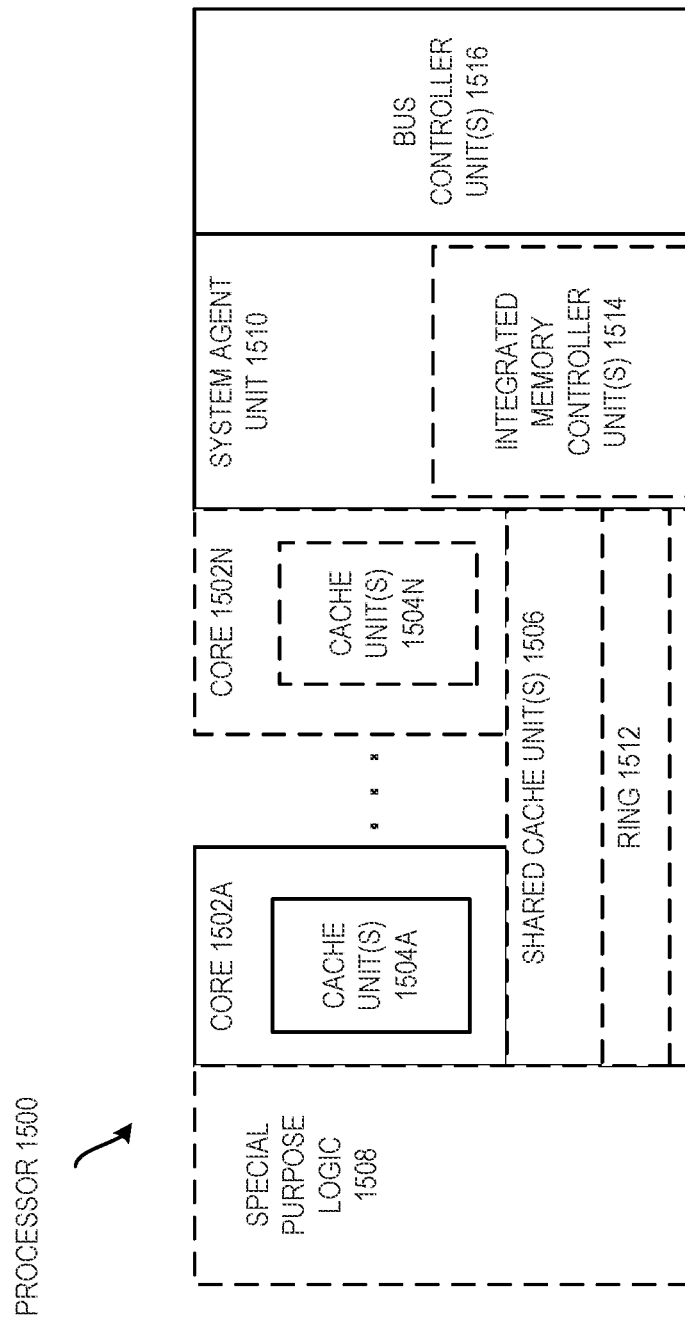
FIG. 15 is a block diagram of an embodiment of a processor that may have more than one core, may have an integrated memory controller, and may have integrated graphics.

FIG. 15 is a block diagram of a processor 1500 that may have more than one core, may have an integrated memory controller, and may have integrated graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
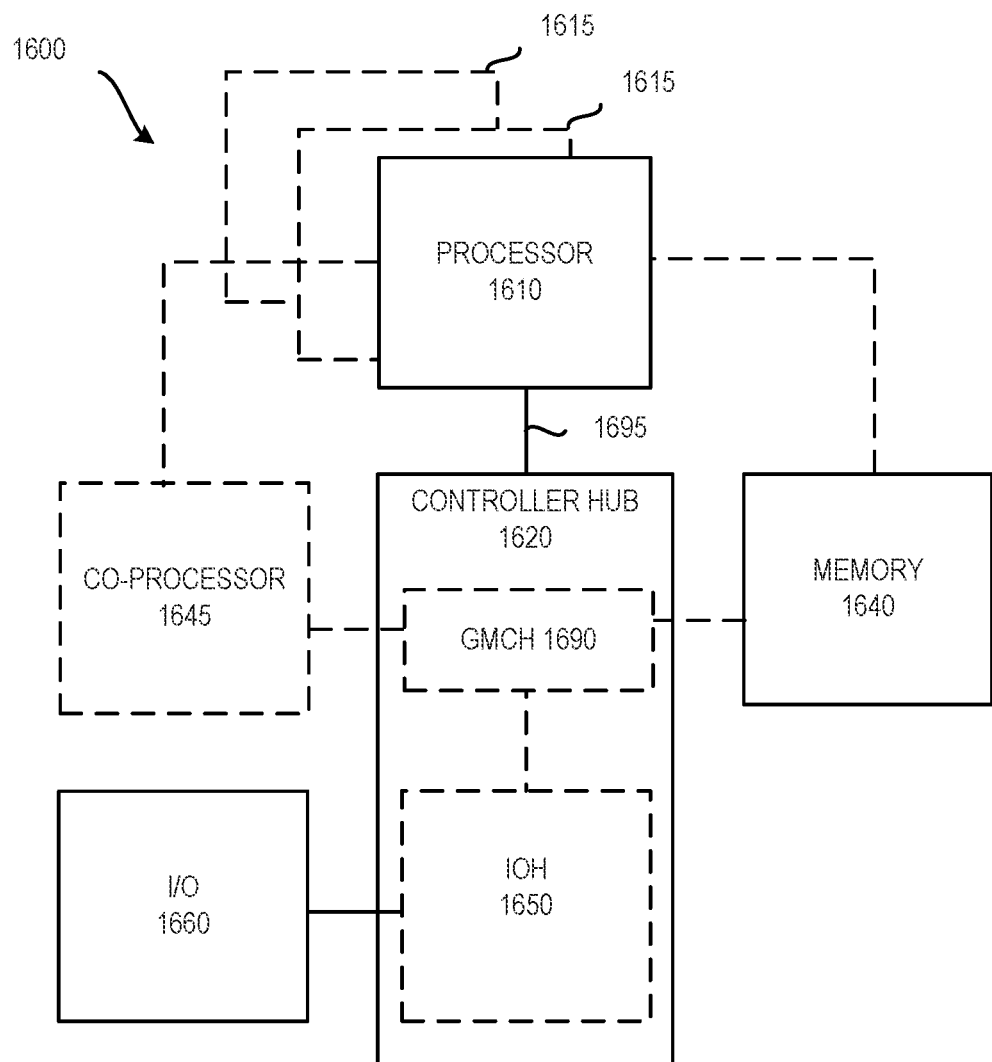
FIG. 16 is a block diagram of a first embodiment of a computer architecture.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 is couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
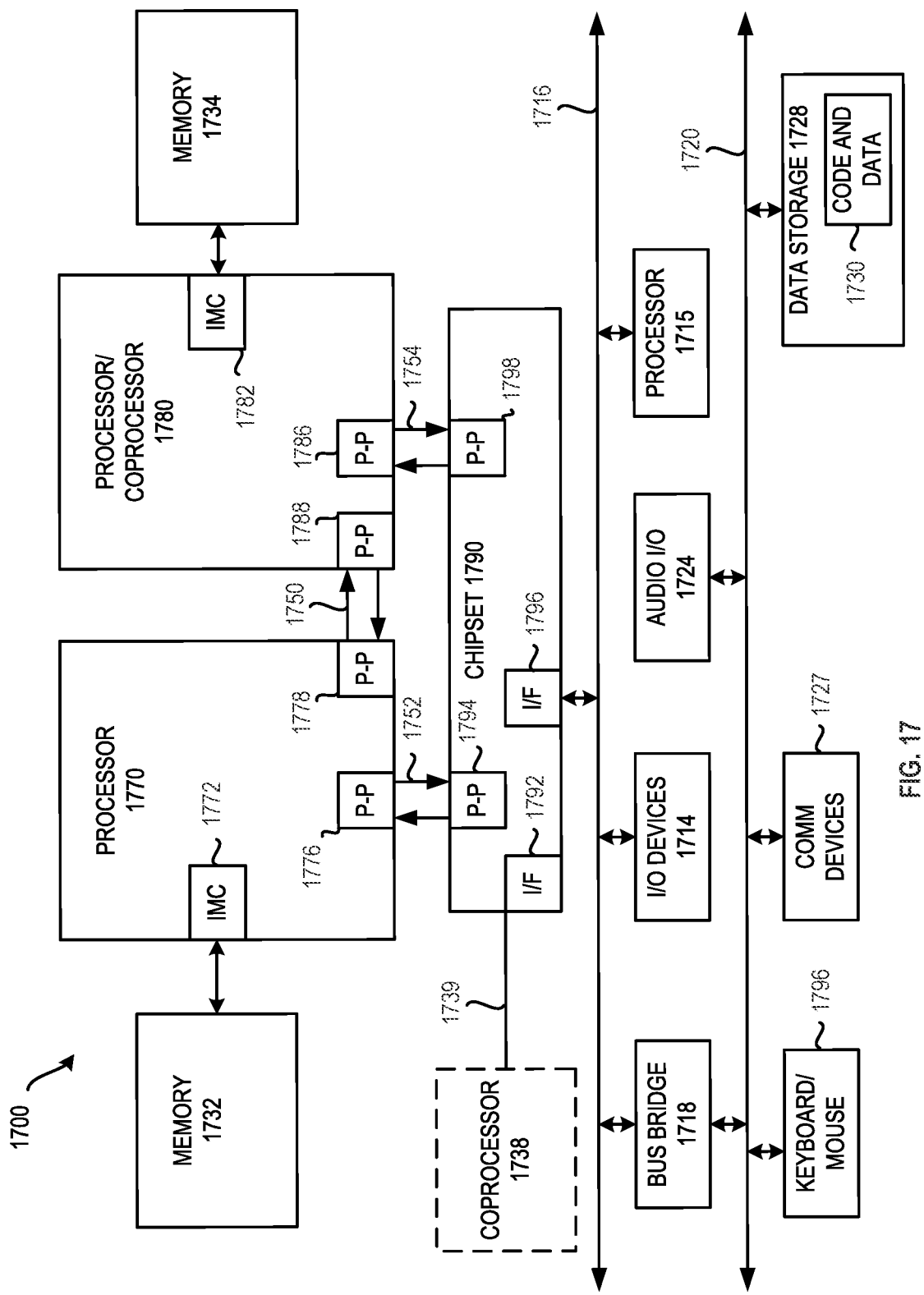
FIG. 17 is a block diagram of a second embodiment of a computer architecture.

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In one embodiment of the invention, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1739. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
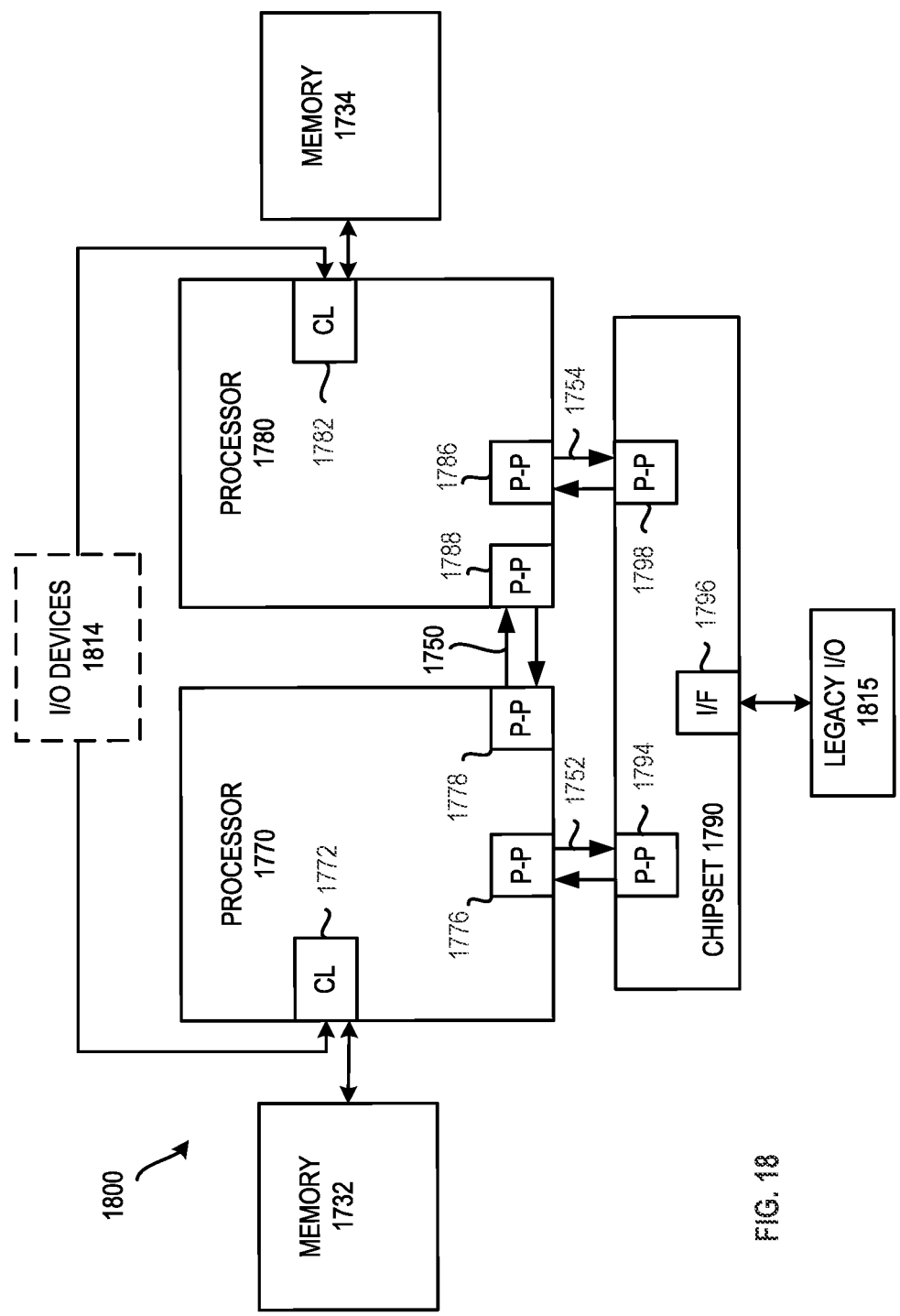
FIG. 18 is a block diagram of a third embodiment of a computer architecture.

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
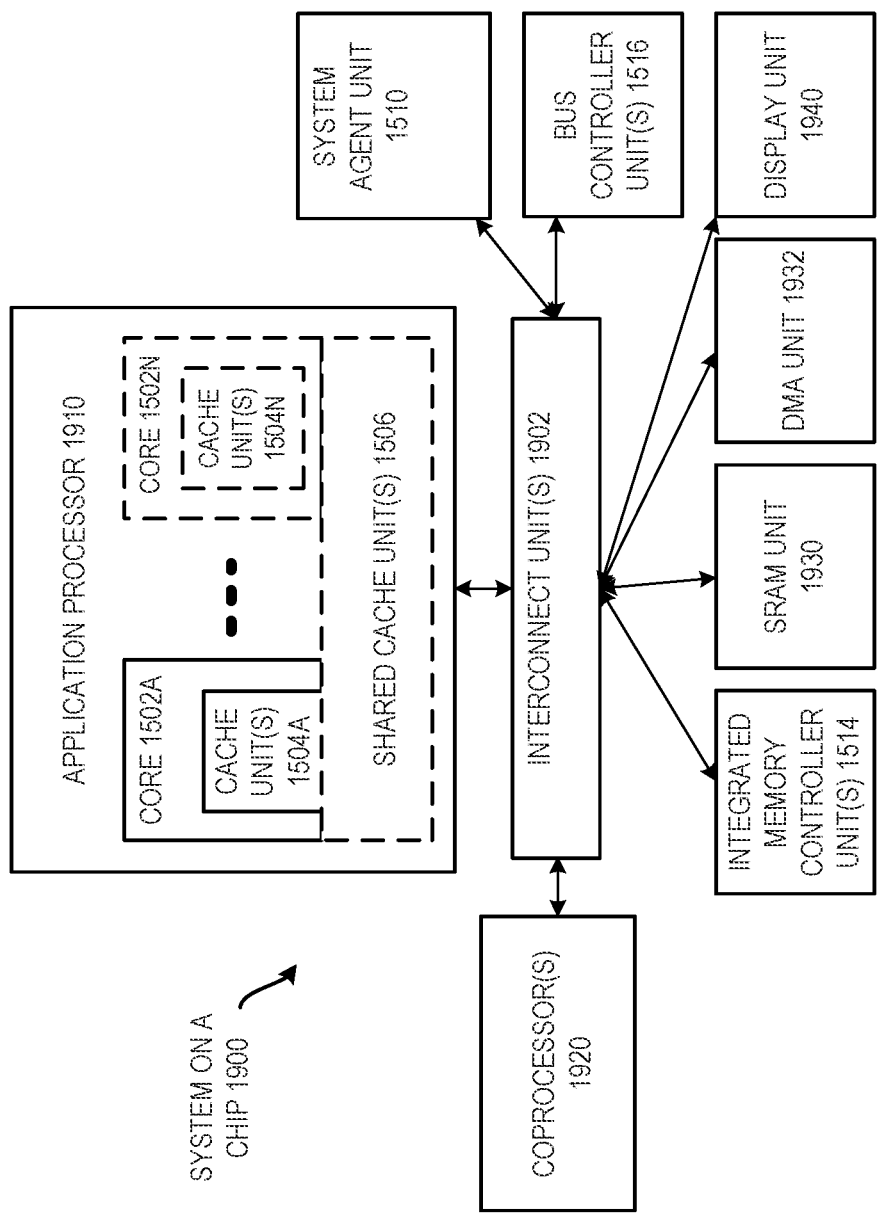
FIG. 19 is a block diagram of a fourth embodiment of a computer architecture.

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 182A-N and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 20:
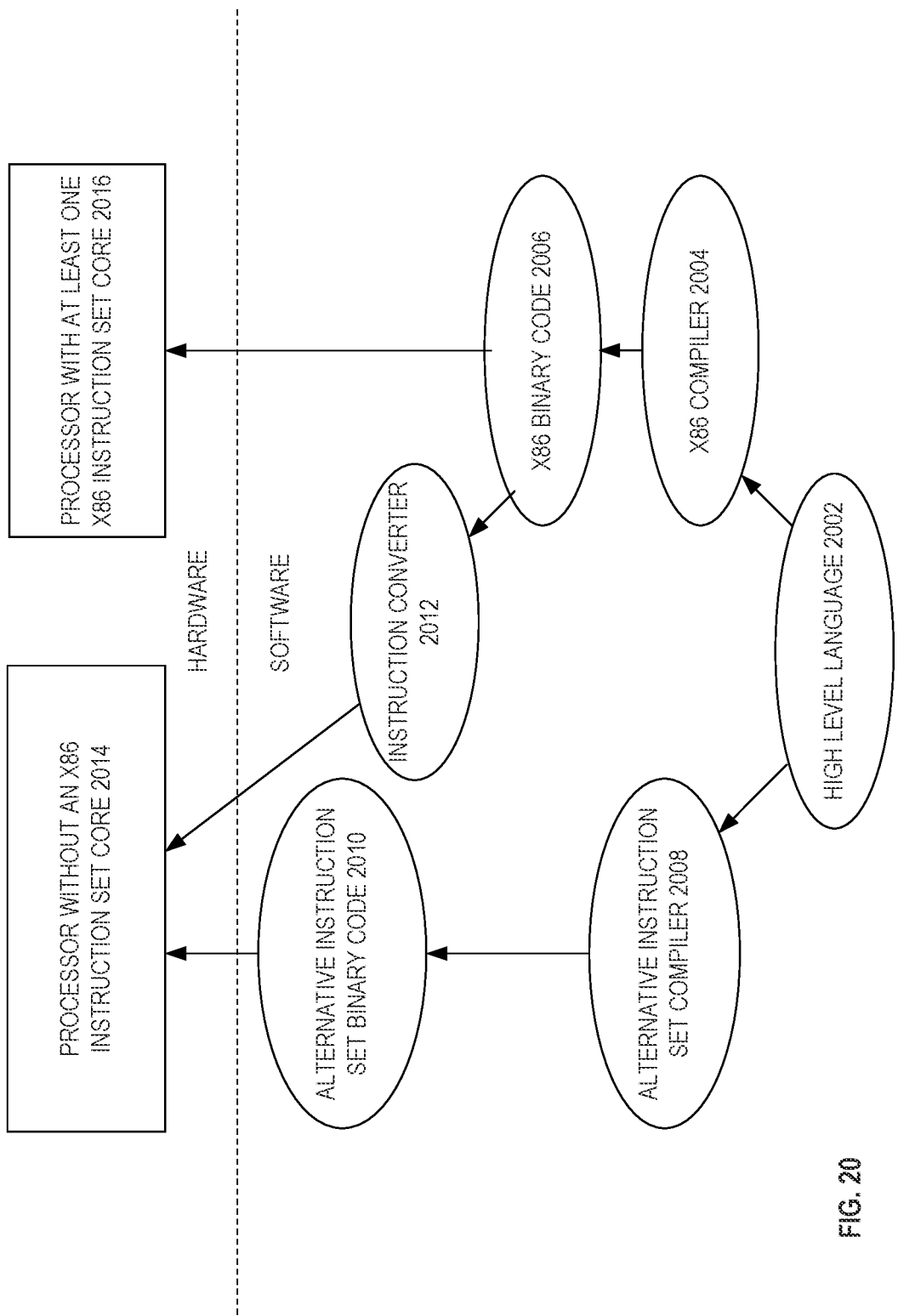
FIG. 20 is a block diagram of use of a software instruction converter to convert binary instructions in a source instruction set to binary instructions in a target instruction set, according to embodiments of the invention.

FIG. 20 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Components, features, and details described for any of FIGS. 1-7 may also optionally apply to any of FIGS. 8-12. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 13-15). In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode an instruction, and an execution unit coupled with the decode unit. The execution unit, in response to the instruction, to determine that an attempted change due to the instruction, to a shadow stack pointer (SSP) of a shadow stack, would cause the SSP to exceed an allowed range, and take an exception in response to determining that the attempted change to the SSP would cause the SSP to exceed the allowed range.

Example 2 includes the processor of Example 1, in which the execution unit, in response to the instruction, is to compare the attempted change to the SSP with a SSP base and an SSP limit that are to specify the allowed range.

Example 3 includes the processor of Example 2, in which the SSP base is to represent a lowest allowed logical address of the shadow stack, and the SSP limit is to represent a highest allowed logical address of the shadow stack.

Example 4 includes the processor of Example 2, in which the SSP base and the SSP limit are to be specified by privileged system software.

Example 5 includes the processor of Example 2, in which the SSP base and the SSP limit are to be stored in control registers of the processor.

Example 6 includes the processor of Example 1, in which the execution unit, in response to the instruction, is to determine that an attempted push of data to the shadow stack due to the instruction would cause the SSP to exceed the allowed range and would cause data to be stored outside of the allowed range.

Example 7 includes the processor of Example 1, in which the execution unit, in response to the instruction, is to determine that an attempted pop of data from the shadow stack due to the instruction would cause a value to be read from outside the allowed range.

Example 8 includes the processor of Example 1, in which the decode unit is to decode the instruction which is to indicate a shadow stack selector, and in which the execution unit, in response to the instruction, is to use the shadow stack selector to select the shadow stack.

Example 9 includes the processor of Example 8, in which the decode unit is to decode the instruction which is to indicate a shadow stack descriptor table (SSDT) selector as the shadow stack selector, in which the SSDT selector is to select an entry that is to correspond to the shadow stack in a shadow stack descriptor table (SSDT).

Example 10 includes the processor of Example 9, in which the entry in the SSDT is to store a SSP base and an SSP limit that are to specify the allowed range.

Example 11 includes the processor of Example 8, in which the execution unit, in response to the instruction, is to determine whether the shadow stack, which the shadow stack selector is to select, is valid.

Example 12 includes the processor of Example 11, in which the decode unit is to decode the instruction which is to indicate a shadow stack descriptor table (SSDT) selector as the shadow stack selector. Also, optionally in which the SSDT selector is to select an entry that is to correspond to the shadow stack in a shadow stack descriptor table (SSDT). Also optionally in which the execution unit, in response to the instruction, is to determine whether the shadow stack is valid based at least in part on a validity indicator of the entry.

Example 13 includes the processor of any one of Examples 1 to 12, in which the processor, in conjunction with taking the exception, is to obtain a shadow stack descriptor table (SSDT) selector from a task state segment structure, and use the shadow stack descriptor table (SSDT) selector to determine an allowed range for a second SSP of a second shadow stack that is to be used by a handler that is to handle the exception.

Example 14 includes the processor of any one of Examples 1 to 12, in which the allowed range is an allowed linear address range.

Example 15 includes the processor of any one of Examples 1 to 12, in which the allowed range is to be specified by privileged system software.

Example 16 includes the processor of any one of Examples 1 to 12, in which the shadow stack is to store copies of return addresses that are stored on a call stack but is not to store user-level data passed as parameters to called procedures.

Example 17 is a processor including a decode unit to decode a save shadow stack pointer instruction, and an execution unit coupled with the decode unit. The execution unit, in response to the shadow stack pointer instruction, is to determine that a push of a shadow stack pointer (SSP) value to a shadow stack would not cause the SSP to exceed an allowed range, and push the SSP value to the shadow stack after determining that the push of the SSP value to the shadow stack would not cause the SSP to exceed the allowed range.

Example 18 includes the processor of Example 17, in which the decode unit is to decode the save shadow stack pointer instruction that is to indicate a destination storage location, and in which the execution unit, in response to the save shadow stack pointer instruction, is to store a current SSP after the push of the SSP value to the shadow stack in the destination storage location.

Example 19 includes the processor of any one of Examples 17 to 18, in which the decode unit is to decode the save shadow stack pointer instruction which is to be a user-level instruction.

Example 20 is a processor including a decode unit to decode a restore shadow stack pointer instruction. The restore shadow stack pointer instruction is to indicate a given shadow stack pointer (SSP) value. An execution unit is coupled with the decode unit. The execution unit, in response to the restore shadow stack pointer instruction, is to determine that the given SSP value does not exceed an allowed range for a corresponding shadow stack. The execution unit is also to determine that the given SSP value indicated by the instruction is compatible with an SSP value received from the corresponding shadow stack. The execution unit is also to change an SSP of the corresponding shadow stack to the given SSP value.

Example 21 includes the processor of Example 20, in which the execution unit, in response to the instruction, is to determine that the given SSP value is within an SSP base and an SSP limit that are to specify the allowed range.

Example 22 includes the processor of Example 21, in which the SSP base is to represent a lowest allowed logical address of the shadow stack, and the SSP limit is to represent a highest allowed logical address of the shadow stack.

Example 23 includes the processor of Example 20, in which the decode unit is to decode the restore shadow stack pointer instruction that is to indicate a shadow stack selector that is to select the corresponding shadow stack.

Example 24 includes the processor of Example 23, in which the decode unit is to decode the instruction which is to indicate a shadow stack descriptor table (SSDT) selector as the shadow stack selector. Also optionally in which the execution unit, in response to the instruction, is to use the SSDT selector to select an entry in a shadow stack descriptor table (SSDT), and in which the entry is to specify the allowed range of the shadow stack.

Example 25 includes the processor of any one of Examples 20 to 24, in which the execution unit, in response to the instruction, is further to compromise the SSP value that is to have been saved on the corresponding shadow stack before the change to the given SSP value.

Example 26 includes the processor of any one of Examples 20 to 24, in which the decode unit is to decode the save shadow stack pointer instruction which is to be a user-level instruction.

Example 27 is a processor including a decode unit to decode a return instruction, and an execution unit coupled with the decode unit. The execution unit, in response to the return instruction, is to receive a return address from a stack, and determine that a pop of a return address from a shadow stack would not cause a value to be read from outside an allowed range of the shadow stack. The execution unit is also to receive the return address from the shadow stack, and determine that the return address from the stack and the return address from the shadow stack are compatible. The execution unit is also to store one of the return address from the stack and the return address from the shadow stack in an instruction pointer register.

Example 28 includes the processor of Example 27, in which the allowed range is an allowed linear address range specified by privileged system software.

Example 29 is a system to process instructions including an interconnect, a processor coupled with the interconnect. The processor is to receive an instruction. The processor, in response to the instruction, is to determine that an attempted change due to the instruction, to a shadow stack pointer (SSP) of a shadow stack, would cause the SSP to exceed an allowed range, and take an exception in response to determining that the attempted change to the SSP would cause the SSP to exceed the allowed range. The system also includes a dynamic random access memory (DRAM) coupled with the interconnect. The DRAM storing a set of instructions of privileged system software, the set of instructions, when executed by the processor, to cause the processor to perform operations including determine the allowed range for the SSP, and store the allowed range for the SSP in an access protected portion of the DRAM.

Example 30 includes the system of Example 29, in which the allowed range includes a linear address range, and in which the instruction is a user-level instruction.

Example 31 includes the processor of any one of Examples 1 to 16, further including an optional branch prediction unit to predict branches, and an optional instruction prefetch unit, coupled with the branch prediction unit, the instruction prefetch unit to prefetch instructions including the instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the instruction, in some cases from one of the L1 instruction cache and the L2 cache, and to provide the instruction to the decode unit. The processor may also optionally include a register rename unit to rename registers, an optional scheduler to schedule one or more operations that have been decoded from the instruction for execution, and an optional commit unit to commit execution results of the instruction.

Example 32 includes the processor or other apparatus of any one of Examples 1 to 16 and optionally any combination of an optional dynamic random access memory (DRAM), an optional graphics device, and an optional wireless transceiver.

Example 33 is a processor or other apparatus substantially as described herein.

Example 34 is a processor or other apparatus to perform (e.g., that has components to perform or that is operative to perform) any instruction substantially as described herein.

Example 35 is a computer system or other electronic device that includes a processor having a decode unit to decode instructions of a first instruction set. The processor also has one or more execution units. The electronic device also includes a storage device coupled with the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to emulate the first instruction.

What is claimed is:
1. A processor comprising:
 a shadow stack pointer (SSP) register to store an SSP, including a first SSP to identify a top of a first shadow stack, the SSP register to indicate a current SSP for a current shadow stack;
 a decode unit to decode a shadow stack protection instruction, the shadow stack protection instruction to indicate a second SSP, the second SSP to identify a top of a second shadow stack; and
 an execution unit coupled with the decode unit, the execution unit, in response to the shadow stack protection instruction, to:
  perform a plurality of security checks, including to determine whether the second SSP is compatible with a value stored on the second shadow stack;
  wherein, if at least one of the security checks fail, the execution unit is further to:
   not make the second SSP the current SSP; and
   cause an exception; and wherein, if all of the security checks succeed the execution unit is further to switch from the first shadow stack to the second shadow stack, wherein to switch from the first shadow stack to the second shadow stack the execution unit is to:
change the value; and
update the SSP register to the second SSP to make the second SSP the current SSP.

2. The processor of claim 1, wherein the shadow stack protection instruction is a restore shadow stack pointer instruction.

3. The processor of claim 1, wherein the second SSP is a linear address.

4. The processor of claim 1, wherein the decode unit is to decode a call instruction, the processor further comprising an execution unit to execute the call instruction, including to:
store a return address on a current stack; and
store the return address on the current shadow stack.

5. The processor of claim 1, wherein the decode unit is to decode a save shadow stack pointer instruction, and the processor further to execute the save shadow stack pointer instruction to store the first SSP to the first shadow stack.

6. The processor of claim 1, wherein the processor, in response to a task switch, is to save the current SSP to a field of a task state segment (TSS) structure in memory.

7. The processor of claim 1, wherein the first and second shadow stacks correspond to one of a plurality of different privilege levels.

8. A method comprising:
storing a first shadow stack pointer (SSP) in a SSP register to identify a top of a first shadow stack, the SSP register to indicate a current SSP for a current shadow stack;
decoding a shadow stack protection instruction, the shadow stack protection instruction indicating a second SSP, the second SSP identify a top of a second shadow stack;
performing a plurality of security checks in response to the shadow stack protection instruction, including determining whether the second SSP is compatible with a value stored on the second shadow stack;
determining that all of the security checks succeed; and
in response to determining that said all of the security checks succeed, switch from the first shadow stack to the second shadow stack, including to:
changing the value; and
updating the SSP register to the second SSP to make the second SSP the current SSP.

9. The method of claim 8, wherein decoding the shadow stack protection instruction comprises decoding a restore shadow stack pointer instruction.

10. The method of claim 8, wherein the second SSP is a linear address.

11. The method of claim 8, further comprising:
decoding a call instruction; and
executing the call instruction, including:
storing a return address on a current stack; and
storing the return address on the current shadow stack.

12. The method of claim 8,
decoding a save shadow stack pointer instruction; and
executing the save shadow stack pointer instruction, wherein executing the save shadow stack pointer instruction comprises storing the first SSP to the first shadow stack.

13. The method of claim 8, further comprising, in response to a task switch, saving the current SSP to a field of a task state segment (TSS) structure in memory.

14. The method of claim 8, wherein the first and second shadow stacks correspond to one of a plurality of different privilege levels.

15. A processor comprising:
a shadow stack pointer (SSP) register to store an SSP, including a first SSP to point to a first shadow stack, the SSP register to indicate a current SSP for a current shadow stack;
first circuitry to decode an instruction, the instruction to indicate a second SSP, the second SSP to point to a second shadow stack; and
second circuitry coupled with the first circuitry, the second circuitry to execute the instruction to:
perform a plurality of security checks, including to determine whether the second SSP is compatible with a value stored on the second shadow stack;
wherein, if at least one of the plurality of security checks fail, the second circuitry is further to:
not make the second SSP the current SSP; and
cause an exception; and
wherein, if the plurality of security checks succeed the second circuitry is further to switch from the first shadow stack to the second shadow stack, wherein to switch from the first shadow stack to the second shadow stack the second circuitry is to:
change the value; and
update the SSP register to the second SSP to make the second SSP the current SSP.

16. The processor of claim 15, wherein the first and second shadow stacks correspond to one of a plurality of different privilege levels, and wherein the processor, in response to a task switch, is to save the current SSP to a field of a task state segment (TSS) structure in memory.

17. A computer system comprising:
a dynamic random access memory (DRAM); and
a processor coupled with the DRAM, the processor comprising:
a shadow stack pointer (SSP) register to store an SSP, including a first SSP to point to a first shadow stack, the SSP register to indicate a current SSP for a current shadow stack;
a decode unit to decode an instruction, the instruction to indicate a second SSP, the second SSP to point to a second shadow stack; and
an execution unit coupled with the decode unit, the execution unit, in response to the instruction, to:
perform a plurality of security checks, including to determine whether the second SSP is compatible with a value stored on the second shadow stack;
wherein, if at least one of the security checks fail, the execution unit is further to:
not make the second SSP the current SSP; and
cause an exception; and
wherein, if all of the security checks succeed the execution unit is further to switch from the first shadow stack to the second shadow stack, wherein to switch from the first shadow stack to the second shadow stack the execution unit is to:
change the value; and
update the SSP register to the second SSP to make the second SSP the current SSP.

18. The computer system of claim 17, wherein the computer system further comprises a mass storage device coupled with the processor, wherein the first and second shadow stacks correspond to one of a plurality of different privilege levels.

19. The computer system of claim 17, wherein the computer system further comprises a communication device coupled with the processor, and wherein the decode unit is to decode a second instruction, and the processor further to execute the second instruction to store the first SSP to the first shadow stack.

20. The computer system of claim 19, wherein the computer system further comprises a coprocessor coupled with the processor, and wherein the decode unit is to decode a call instruction, the processor further comprising an execution unit to execute the call instruction, including to:

store a return address on a current stack; and store the return address on the current shadow stack.

21. The computer system of claim 20, wherein the coprocessor comprises a network processor, and wherein the processor, in response to a task switch, is to save the current SSP to a field of a task state segment (TSS) structure in memory.

* * * * *